(12) United States Patent
Park et al.

(10) Patent No.: US 10,613,399 B2
(45) Date of Patent: Apr. 7, 2020

(54) LIQUID CRYSTAL DISPLAY DEVICE

(71) Applicant: Samsung Display Co. Ltd., Yongin-si, Gyeonggi-do (KR)

(72) Inventors: Kee Bum Park, Cheonan-si (KR); Hyung Jin Song, Seongnam-si (KR); Jae Won Kim, Asan-si (KR); Yoo Mi Ra, Ansan-si (KR); Do Yeong Park, Seoul (KR); Kye Uk Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 401 days.

(21) Appl. No.: 15/379,281

(22) Filed: Dec. 14, 2016

(65) Prior Publication Data

US 2017/0184932 A1    Jun. 29, 2017

(30) Foreign Application Priority Data

Dec. 28, 2015    (KR) ........................ 10-2015-0187544

(51) Int. Cl.
*G02F 1/1362* (2006.01)
*G02F 1/1337* (2006.01)
*G02F 1/136* (2006.01)

(52) U.S. Cl.
CPC .. *G02F 1/136209* (2013.01); *G02F 1/133707* (2013.01); *G02F 2001/13606* (2013.01); *G02F 2001/136218* (2013.01); *G02F 2201/40* (2013.01)

(58) Field of Classification Search
CPC ... G02F 1/136209; G02F 2001/136218; G02F 1/133707; G02F 2001/13606; G02F 2201/40
USPC ........................................ 349/110
See application file for complete search history.

(56) References Cited

U.S. PATENT DOCUMENTS

| | | | |
|---|---|---|---|
| 2010/0020257 A1* | 1/2010 | Jun ................... | G02F 1/134336 349/44 |
| 2012/0038844 A1* | 2/2012 | Choi ................... | G02F 1/13394 349/43 |
| 2014/0198278 A1* | 7/2014 | Kesho ............... | G02F 1/134336 349/46 |

* cited by examiner

*Primary Examiner* — Nathanael R Briggs
*Assistant Examiner* — William D Peterson
(74) *Attorney, Agent, or Firm* — Innovation Counsel LLP

(57) ABSTRACT

A liquid display device is provided. The liquid crystal display device includes a first base substrate, a first signal line disposed on the first base substrate and extended in a first direction, a second signal line disposed on the first base substrate, extended in a second direction intersecting the first direction, and insulated from the first signal line, a thin film transistor disposed on the first base substrate and electrically connected to the first signal line and the second signal line, a pixel electrode electrically connected to the thin film transistor, and a shield pattern disposed on a same layer as but spaced apart from the pixel electrode, overlapped with the thin film transistor, and including a material same as a material of the pixel electrode.

26 Claims, 26 Drawing Sheets

LIQUID CRYSTAL DISPLAY DEVICE

CROSS-REFERENCE TO RELATED APPLICATION

This application claims priority from Korean Patent Application No. 10-2015-0187544 filed on Dec. 28, 2015 in the Korean Intellectual Property Office, the disclosure of which is incorporated herein by reference in its entirety.

BACKGROUND

1. Technical Field

The present inventive concept relates to a liquid crystal display device.

2. Description of the Related Art

A liquid crystal display (LCD) is presently one of the most widely used flat panel display devices, and generally includes two substrates having electric field generating electrodes, such as pixel electrodes and a common electrode, formed thereon, and a liquid crystal layer interposed between the substrates. When a voltage is applied to the electric field generating electrodes, an electric field is generated in the liquid crystal layer, which determines the orientation of the liquid crystal molecules of the liquid crystal layer and controls the polarization of incident light, thereby displaying desired images.

The pixel electrodes are electrically connected to a thin film transistor, which is a switching element, and receive voltages for generating electric fields.

As described above, an LCD may include pixel electrodes, a common electrode, a thin film transistor and other electrical elements. This may result in the occurrence of crosstalk between the electrical elements due to parasitic capacitance therebetween, causing degradation of display quality.

SUMMARY

An embodiment of the present inventive concept provides a liquid crystal display device with improved display quality.

However, embodiments of the present inventive concept are not restricted to those set forth herein. The other embodiments of the present inventive concept that are not mentioned herein will become more apparent to a person skilled in the art to which the present inventive concept pertains by referencing the detailed description of the present inventive concept given below.

According to an aspect of the present inventive concept, there is provided a liquid crystal display device. The liquid crystal display device includes a first base substrate, a first signal line disposed on the first base substrate and extended in a first direction, a second signal line disposed on the first base substrate, extended in a second direction intersecting the first direction, and insulated from the first signal line, a thin film transistor disposed on the first base substrate and electrically connected to the first signal line and the second signal line, a pixel electrode electrically connected to the thin film transistor, and a shield pattern disposed on a same layer as but spaced apart from the pixel electrode, overlapped with the thin film transistor, and including a material same as a material of the pixel electrode.

According to another aspect of the present inventive concept, there is provided a liquid crystal display device. The liquid crystal display device includes a first base substrate, a first signal line disposed on the first base substrate and extended in a first direction, a second signal line disposed on the first base substrate, insulated from the first signal line and extended in a second direction intersecting the first direction, a thin film transistor disposed on the first base substrate and electrically connected to the first signal line and the second signal line, an insulation layer disposed on the thin film transistor and the second signal line, a shield electrode disposed on the second signal line along the second direction and overlapped with the second signal line, and a shield pattern disposed on the thin film transistor, overlapped with the thin film transistor, and including a material same as a material of the shield electrode.

Other specific features of the embodiments are included in the detailed description and drawings.

The embodiments of the present inventive concept may at least provide effects described below.

That is, a display device with improved display quality may be provided.

However, effects of the present inventive concept are not restricted to the exemplary embodiments set forth herein and more diverse effects are included in this description.

DETAILED DESCRIPTION OF THE EMBODIMENTS

Figure 1:
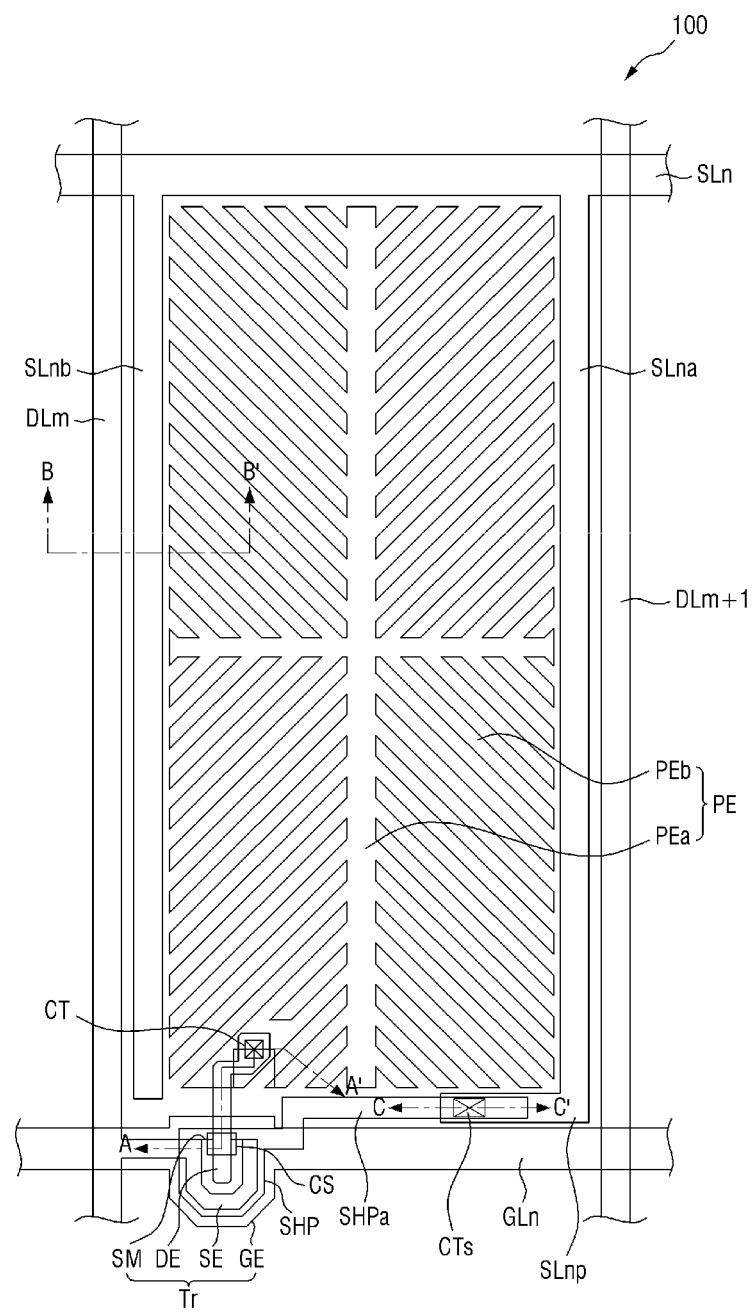
FIG. 1 is a schematic plan view illustrating an array substrate of a liquid crystal display device according to an exemplary embodiment of the present inventive concept, and more specifically, a plan view schematically illustrating the structure of one pixel.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided to help convey the concept of the inventive concept to those skilled in the art. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it may be directly on, connected or coupled to the other element or layer, or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections are not limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations), and the spatially relative descriptors used herein are to be interpreted accordingly.

Unless otherwise defined, all terms (including technical and scientific terms) used herein have the meaning as commonly understood by one of ordinary skill in the art to which the present application belongs. It will be further understood that terms, such as those defined in commonly used dictionaries, have a meaning that is consistent with their meaning in the context of the relevant art and this specification and are not to be interpreted in an idealized or overly formal sense unless expressly so defined herein.

In the drawings, identical or similar parts or elements are indicated by the same reference numerals.

A liquid crystal display device according to the present inventive concept may include a first signal line extended in a first direction, a second signal line extended in a second direction intersecting the first direction and insulated from the first signal line, and a thin film transistor electrically connected to the first signal line and the second signal line.

Hereinafter, for convenience of explanation, an exemplary embodiment is described, in which the first signal line is a gate line and the second signal line is a data line, but the present disclosure is not limited thereto, and the first signal line may be a data line and the second signal line may be a gate line.

Embodiments of the present inventive concept are hereinafter described with reference to the drawings.

Figure 2:
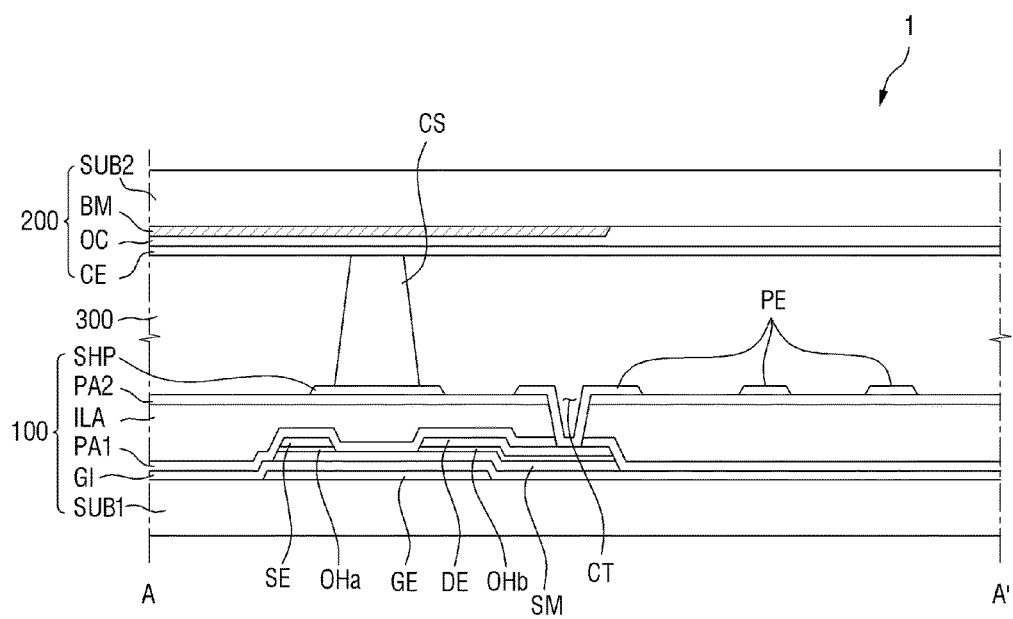
FIG. 2 is a schematic cross-sectional view taken along line A-A' of FIG. 1 and illustrates the liquid crystal display device including the array substrate of FIG. 1.
Figure 3:
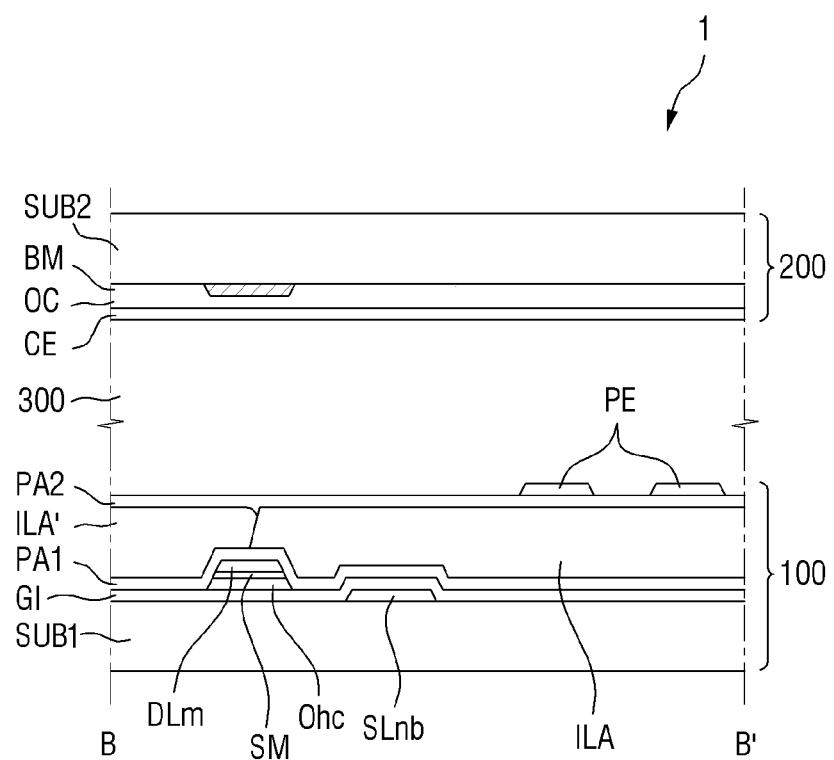
FIG. 3 is a schematic cross-sectional view taken along line B-B' of FIG. 1 and illustrates the liquid crystal display device including the array substrate of FIG. 1.
Figure 4:
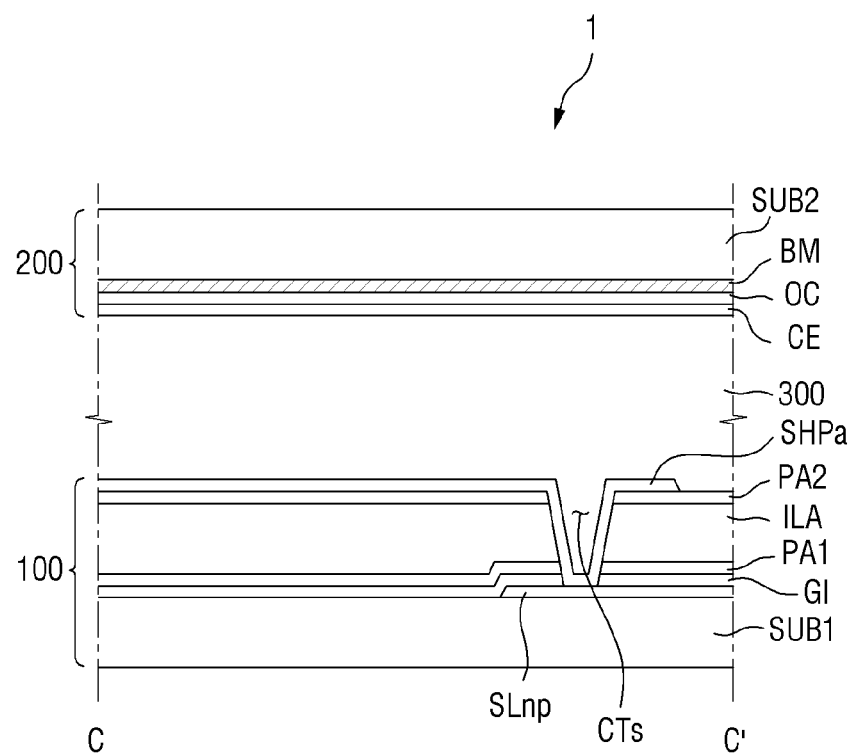
FIG. 4 is a schematic cross-sectional view taken along line C-C' of FIG. 1 and illustrates the liquid crystal display device including the array substrate of FIG. 1.
Figure 5:
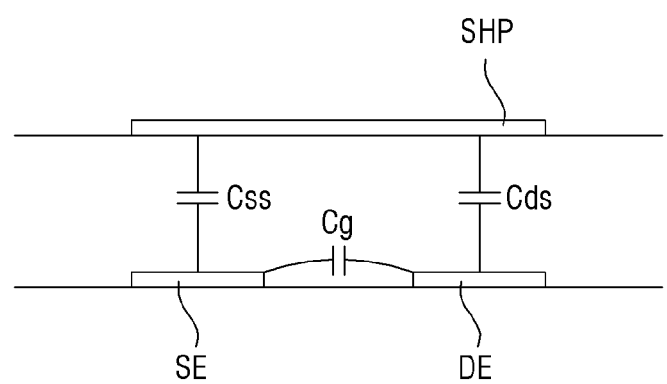
FIG. 5 illustrates the function of a shield pattern of the liquid crystal display device according to the exemplary embodiment of the present inventive concept.

FIG. 1 is a schematic plan view illustrating an array substrate of a liquid crystal display device according to an exemplary embodiment of the present inventive concept, and more specifically, a plan view schematically illustrating the structure of one pixel. FIG. 2 is a schematic cross-sectional view taken along line A-A' of FIG. 1 and illustrates the liquid crystal display device including the array substrate of FIG. 1. FIG. 3 is a schematic cross-sectional view taken along line B-B' of FIG. 1 and illustrates the liquid crystal display device including the array substrate of FIG. 1. FIG. 4 is a schematic cross-sectional view taken along line C-C' of FIG. 1 and illustrates the liquid crystal display device including the array substrate of FIG. 1. FIG. 5 illustrates the function of a shield pattern of the liquid crystal display device according to the exemplary embodiment of the present inventive concept.

Referring to FIG. 1 to FIG. 5, a liquid crystal display device 1 according to the exemplary embodiment of the present inventive concept may include an array substrate 100, an opposing substrate 200 facing the array substrate 100, and a liquid crystal layer 300 interposed between the array substrate 100 and the opposing substrate 200, and may further include a pair of polarizers (not shown) attached to outer surfaces of the array substrate 100 and the opposing substrate 200.

The array substrate 100 may be a thin film transistor array substrate on which thin film transistors Trs are formed to drive liquid crystal molecules of the liquid crystal layer 300, and the opposing substrate 200 may face the array substrate 100.

The liquid crystal layer 300 may include a plurality of liquid crystal molecules having dielectric anisotropy. The liquid crystal molecules may be vertically aligned liquid crystal molecules interposed between the array substrate 100 and the opposing substrate 200 in the direction perpendicular to the planar surfaces of the two substrates 100 and 200. The liquid crystal molecules may rotate in a certain direction between the array substrate 100 and the opposing substrate 200 when an electric field is applied between the array substrate 100 and the opposing substrate 200, thereby transmitting or blocking light. The term "rotate" as used herein may not only mean that the liquid crystal molecules actually rotate but also mean that the orientation of the liquid crystal molecules changes due to the electric field.

The array substrate 100 is now described.

A first base substrate SUB1 may be a transparent insulation substrate. For example, the first base substrate SUB1 may be made of a glass substrate, a quartz substrate, a transparent resin substrate and the like. Furthermore, the first base substrate SUB1 may include polymers or plastics excellent in heat resisting property. In some embodiments, the first base substrate SUB1 may have flexibility. That is, the first substrate 100 may be a transformable substrate that can be rolled, folded or bent. A gate line GLn and a gate electrode GE may be disposed on the first base substrate SUB1. The gate line GLn may transmit a gate signal and mainly extend in the first direction (for example, a horizontal direction as shown in FIG. 1). The gate electrode GE may protrude from the gate line GLn. The gate line GLn and the gate electrode GE may include aluminum-based metal such as aluminum (Al) or aluminum alloy, silver-based metal such as silver (Ag) or silver alloy, copper-based metal such as copper (Cu) or copper alloy, molybdenum-based metal such as molybdenum (Mo) or molybdenum alloy, chrome (Cr), tantalum (Ta), titanium (Ti) and the like. The gate line GLn and the gate electrode GE may have a single layer structure or a multi-layer structure including at least two conductive layers having different physical properties. One of the at least two conductive layers may be made of a low resistance metal, for example, aluminum-based metal, silver-based metal, copper-based metal and the like so as to reduce signal delay or voltage drop. The other conductive layer may be made of other materials, specifically, materials excellent in indium tin oxide (ITO) and indium zinc oxide (IZO) contact properties, for example, molybdenum-based metal, chrome, titanium, tantalum and the like. One example of a layer combination may include a lower chrome layer and an upper aluminum layer, and another example may include a lower aluminum layer and an upper molybdenum layer. However, the present disclosure is not limited thereto, and the gate line GLn and the gate electrode GE may be made of various metals and conductors.

A gate insulation layer GI may be disposed on the gate line GLn and the gate electrode GE. The gate insulation layer GI may be made of an insulation material, for example, an organic insulation material, such as silicon nitride, silicon oxide, silicon oxynitride and the like. The gate insulation layer GI may have a single layer structure or a multi-layer structure including at least two insulation layers having different physical properties.

A semiconductor layer SM may be disposed on the gate insulation layer GI and at least partially overlapped with the gate electrode GE. The semiconductor layer SM may include amorphous silicon, polycrystalline silicon or oxide semiconductor.

A plurality of ohmic contact members OHa, OHb and Ohc may be disposed on the semiconductor layer SM. The plurality of ohmic contact members OHa, OHb and Ohc may include a source ohmic contact member OHa disposed beneath a source electrode SE, which is described later, a drain ohmic contact member OHb disposed beneath a drain electrode DE, and a data ohmic contact member Ohc disposed beneath data lines DLm and DLm+1. The plurality of ohmic contact members OHa, OHb and Ohc may be made of n+ hydrated amorphous silicon, which is highly doped with n-type impurities, or silicide.

In some embodiments, the ohmic contact members OHa, OHb and Ohc may be omitted when the semiconductor layer SM is an oxide semiconductor.

The source electrode SE, the drain electrode DE and the data lines DLm and DLm+1 may be disposed on the ohmic contact members OHa, OHb and Ohc and the gate insulation layer GI. The data lines DLm and DLm+1 may transmit a data voltage and extend in the second direction (for example, a vertical direction as shown in FIG. 1) intersecting the first direction so as to intersect the gate line GLn. Hereinafter, for convenience of explanation, the data line provided on the left side of a pixel electrode PE, which is described later, is referred to hereinafter as a first data line DLm, and the data line provided on the right side of the pixel electrode PE is referred to as a second data line DLm+1.

The source electrode SE may be connected to the first data line DLm and protrude from the first data line DLm to overlap the gate electrode GE. In some embodiments, the part of the source electrode SE disposed above the gate electrode GE may have a C shape.

The drain electrode DE may be spaced apart from the source electrode SE above the gate electrode GE. The drain electrode DE may include a rod part extending roughly in parallel with the source electrode SE and an extended part opposite to the rod part.

The data lines DLm and DLm+1, the source electrode SE and the drain electrode DE may be made of aluminum, copper, silver, molybdenum, chrome, titanium, tantalum or an alloy thereof and have a multi-layer structure including a lower layer (not shown) made of refractory metal and the like and a low resistance upper layer (not shown) formed on the lower layer, but the present disclosure is not limited thereto.

The gate electrode GE, the source electrode SE and the drain electrode DE may cooperate with the semiconductor layer SM to form one thin film transistor Tr, and a channel of the thin film transistor may be formed in the semiconductor layer SM between the source electrode SE and the drain electrode DE.

A first passivation layer PA1 may be disposed on the gate insulation layer GI, the semiconductor layer SM, the source electrode SE and the drain electrode DE. The first passivation layer PA1 may be made of an organic insulation material, an inorganic insulation material or the like. The first passivation layer PA1 protects the thin film transistor Tr and prevents a material contained in an insulation layer ILA, which is described later, from being introduced into the semiconductor layer SM.

The insulation layer ILA may be disposed on the first passivation layer PA1. In some embodiments, the insulation layer ILA may planarize an upper part of the first passivation layer PA1. The insulation layer ILA may include a photosensitive material. The photosensitive material may be a photosensitive organic material, for example, photoresist. In some embodiments, the insulation layer ILA may include a negative photoresist in which a part thereof exposed to light is hardened or a positive photoresist in which a part thereof not exposed to light is hardened.

The insulation layer ILA may further include a color pigment. For example, the insulation layer ILA may include a color pigment that passes light of a wavelength range corresponding to a specific color. That is, the insulation layer ILA may be a color filter. In an exemplary embodiment, the color filter may enable display of one color among primary colors including red, green and blue colors. However, the colors are not limited to the primary colors of red, green and blue. In some exemplary embodiments, the colors may be any one of cyan, magenta, yellow and white. When the insulation layer ILA includes a color pigment, the insulation layer ILA may be at least partially overlapped with an insulation layer ILA' of a neighboring pixel above the data lines DLm and DLm+1.

A second passivation layer PA2 may be disposed on the insulation layer ILA. The second passivation layer PA2 may include an organic insulation material, such as silicon oxide, silicon nitride, silicon oxynitride and the like. The second passivation layer PA2 prevents the insulation layer ILA from coming off and inhibits the liquid crystal layer 300 from being contaminated by an organic material, such as a solvent introduced from the insulation layer ILA. Thus, defects, such as afterimage, which might otherwise occur during an operation of the liquid crystal display device 1 is prevented.

The pixel electrode PE may be disposed on the insulation layer ILA and the second passivation layer PA2. In this case, a contact hole CT that exposes a part of the drain electrode DE may be formed in the insulation layer ILA and the second passivation layer PA2. Furthermore, the pixel electrode PE may contact the drain electrode DE through the contact hole CT so as to be electrically connected to the thin film transistor Tr. The pixel electrode PE may be made of a transparent conductive material, such as ITO, IZO, ITZO and AZO.

The pixel electrode PE may include a stem PEa and a plurality of branches PEbs connected to the stem PEa and spaced apart from each other. In an exemplary embodiment, the stem PEa may have a cross shape as shown in FIG. 1, and in this case, one pixel may be divided into a plurality of regions, that is, a plurality of domains, by the stem PEa. The branches PEbs may be arranged in different directions in each domain. In the exemplary embodiment, one pixel is formed of four domains as shown in FIG. 1, but the present disclosure is not limited thereto. The plurality of branches PEbs may be spaced apart from each other and extend in the directions substantially parallel to each other in the regions divided by the stem PEa. The branches PEbs adjacent each other may be spaced apart from each other on a micrometer basis. The branches PEbs may enable the liquid crystal molecules of the liquid crystal layer 300 to be aligned at a specific azimuth angle on a plane parallel to the first base substrate SUB1.

FIG. 1 depicts a horizontal width of the pixel electrode PE, that is, a width in the direction along which the gate line GLn extends, being narrower than a vertical width of the pixel electrode PE, that is, a width in the direction along which the data lines DLm and DLm+1 extend, but this is merely an exemplary embodiment. In some other embodiments, unlike those shown in the drawing, the horizontal width of the pixel electrode PE, that is, the width in the direction along which the gate line GLn extends, may be wider than the vertical width of the pixel electrode PE, that is, the width in the direction along which the data lines DLm and DLm+1 extend.

A sustain electrode line SLn may further be provided on the first base substrate SUB1. The sustain electrode line SLn may extend in the direction substantially the same as that of the gate line GLn (for example, a horizontal direction). The sustain electrode line SLn may further include a first sustain electrode SLna and a second sustain electrode SLnb surrounding at least a part of the pixel electrode PE, which will be described later. The first sustain electrode SLna and the second sustain electrode SLnb blocks or reduces a coupling electric field between the first and second data lines DLm and DLm+1 and the pixel electrode PE, which is described later. Furthermore, the sustain electrode line SLn may further include a sustain electrode extension SLnp extending from the first sustain electrode SLna or the second sustain electrode SLnb. In some embodiments, the sustain electrode extension SLnp may extend to a space between the pixel electrode PE and the gate line GLn as seen in a plan view. Although the sustain electrode extension SLnp is depicted as being connected to the first sustain electrode SLna in FIG. 1, the present disclosure is not limited thereto, and the sustain electrode extension SLnp may be connected to the second sustain electrode SLnb.

In an exemplary embodiment, the sustain electrode line SLn may be disposed on the same layer as the gate line GLn and the gate electrode GE and made of a material same as that of the gate line GLn and the gate electrode GE. That is, in the exemplary embodiment, the sustain electrode line SLn may be interposed between the first base substrate SUB1 and the gate insulation layer GI and made of a material same as that of the gate line GLn. Although not shown in the drawings, in another exemplary embodiment, the sustain electrode line SLn may be disposed on the same layer as the data lines DLm and DLm+1 and made of a material same as that of the data lines DLm and DLm+1, which means the sustain electrode line SLn, like the data lines DLm and DLm+1, may be interposed between the gate insulation layer GI and the first passivation layer PA1. Hereinafter, for convenience of explanation, an exemplary embodiment in which the sustain electrode line SLn is disposed on the same layer as the gate line GLn is described.

A shield pattern SHP may be disposed on the second passivation layer PA2. The shield pattern SHP may be physically spaced apart from the pixel electrode PE and disposed on the same layer as the pixel electrode PE. That is, like the pixel electrode PE, the shield pattern SHP may be disposed directly on and directly contact the second passivation layer PA2. The shield pattern SHP may be made of a transparent conductive material and made of a material same as that of the pixel electrode PE. In some embodiments, the shield pattern SHP and the pixel electrode PE may be simultaneously formed in the same process by using a single mask.

The shield pattern SHP may be overlapped with the thin film transistor Tr in a plan view, and in an exemplary embodiment, the shield pattern SHP may be overlapped with the source electrode SE and the drain electrode DE of the thin film transistor Tr.

In some embodiments, a common voltage Vcom or a sustain voltage Vc may be applied to the shield pattern SHP.

The shield pattern SHP may further include a first shield pattern extension SHPa. The first shield pattern extension SHPa may extend toward the sustain electrode extension SLnp and contact the sustain electrode extension SLnp through a sustain electrode contact hole CTs formed in the gate insulation layer GI, the first passivation layer PA1, the insulation layer ILA and the second passivation layer PA2. Thus, when the sustain voltage Vc is applied to the shield pattern SHP, the shield pattern SHP may be electrically connected to the sustain electrode line SLn and receive the sustain voltage Vc applied thereto. The sustain voltage Vc may be substantially the same as the common voltage Vcom or may have a small voltage level difference from the common voltage Vcom.

However, the present disclosure is not limited thereto, and the shield pattern SHP may receive the common voltage Vcom through a separate terminal. In other exemplary embodiments, the shield pattern SHP may be in a floated state.

A spacer CS may be disposed on the shield pattern SHP. The spacer CS may serve to maintain a distance between the array substrate 100 and the opposing substrate 200. In some embodiments, the spacer CS may include a transparent organic insulation material, such as acrylate or a transparent inorganic insulation material. When the spacer CS is made of an organic insulation material, the spacer CS may include a photosensitive organic insulation material.

In some embodiments, the spacer CS may be disposed on a part of the shield pattern SHP overlapped with the thin film transistor Tr. By enabling the spacer CS to be overlapped with the thin film transistor Tr, the size of a light blocking member BM, which is described later, may be relatively reduced, thus providing advantages of improved aperture ratio of the liquid crystal display device 1.

The spacer CS may directly contact the shield pattern SHP and may be disposed directly on the shield pattern SHP. The shield pattern SHP may include a transparent conductive material and the like, and the second passivation layer PA2 may include an inorganic insulation material and the like, and thus the adhesion force between the spacer CS and the shield pattern SHP may be relatively larger than the adhesion force between the spacer CS and the second passivation layer PA2. In the present inventive concept, the spacer CS may be disposed on the shield pattern SHP, thereby lowering the probability that the spacer CS is separated from the array substrate 100 or moves to an unintended region, thereby providing advantages of improved reliability of the liquid crystal display device 1.

The opposing substrate 200 is now described.

The opposing substrate 200 may include a second base substrate SUB2, a light blocking member BM, an overcoat layer OC and a common electrode CE.

Like the first base substrate SUB1, the second base substrate SUB2 may be a transparent insulation substrate. Furthermore, the second base substrate SUB2 may include polymers or plastics excellent in heat resisting property. In some embodiments, the second base substrate SUB2 may have flexibility.

The light blocking member BM may be disposed between the second base substrate SUB2 and the liquid crystal layer 300, more specifically, on one surface of the second base substrate SUB2 facing the first base substrate SUB1. In some embodiments, the light blocking member BM may include a part overlapped with the gate line GLn and the thin film transistor Tr and a part overlapped with the data lines DLm and DLm+1. The light blocking member BM may include a light blocking pigment, such as black carbon, or an opaque material, such as chrome (Cr), and include a photosensitive organic material.

The overcoat layer OC may be formed on the second base substrate SUB2 and the light blocking member BM and cover the light blocking member BM. The overcoat layer OC may planarize a stepped portion formed by the light blocking member BM. In some embodiments, the overcoat layer OC may be omitted.

The common electrode CE may be disposed on the overcoat layer OC. In some embodiments, when the overcoat layer OC is omitted, the common electrode CE may be disposed on the second base substrate SUB2 and the light blocking member BM. The common electrode CE may be made of a transparent conductive material, such as ITO and IZO. In some embodiments, the common electrode CE may be formed all over the whole surface of the second base substrate SUB2. A common voltage Vcom may be applied to the common electrode CE to generate an electric field between the common electrode CE and the pixel electrode PE. The pixel electrode PE may receive a data voltage through the thin film transistor Tr, and the common electrode CE may receive the common voltage Vcom having a level different from that of the data voltage. Thus, an electric field having an intensity corresponding to an electric potential difference between the common voltage Vcom and the data voltage may be generated between the pixel electrode PE and the common electrode CE, and the alignment of the liquid crystal molecules in the liquid crystal layer 300 may change according to the intensity of the electric field, thereby controlling light transmittance.

Crosstalk defects may be caused by parasitic capacitance of the thin film transistor Tr during operation of the thin film transistor Tr described above. For example, a coupling electric field may be generated between the source electrode SE and the drain electrode DE, and thus parasitic capacitance Cg may be generated. Furthermore, parasitic capacitance may be generated between components other than the source electrode SE and the drain electrode DE and also between the drain electrode DE and other components, thus causing undesired crosstalk defects.

In the liquid crystal display device 1 according to the exemplary embodiment of the present inventive concept, the shield pattern SHP may be disposed on the thin film transistor Tr, thereby suppressing parasitic capacitance of the thin film transistor Tr itself. In the exemplary embodiment, the shield pattern SHP may be disposed on the thin film transistor Tr, thereby generating a first capacitance Css between the source electrode SE and the shield pattern SHP and a second capacitance Cds between the drain electrode DE and the shield pattern SHP. Thus, in such case, the parasitic capacitance Cg generated between the source electrode SE and the drain electrode DE is suppressed or reduced. Resultantly, occurrence of crosstalk defects is suppressed, and display quality of the liquid crystal display device 1 is improved.

Furthermore, since the shield pattern SHP is disposed on the thin film transistor Tr, a coupling electric field between the thin film transistor Tr and other components, for example, data lines DLm and DLm+1 is blocked, thereby further suppressing occurrence of crosstalk defects.

The sustain voltage Vc, or a voltage having a level same as that of the voltage applied to the common electrode CE, for example, the common voltage Vcom, may be applied to the shield pattern SHP. In such case, no electric field would be generated between the common electrode CE and the shield pattern SHP, or even if an electric field is generated therebetween, the intensity of the electric field would be low. Therefore, the probability of misalignment of the liquid crystal molecules disposed in a region adjacent to the thin film transistor Tr may be lowered. Thus, light leakage caused by the misalignment of liquid crystal molecules in the vicinity of the thin film transistor Tr may be reduced, and an area of the light blocking member BM disposed to prevent the light leakage may be reduced. Thus, an aperture ratio of the liquid crystal display device 1 may be increased.

Hereinafter, identical reference numerals are used to identify identical components of the foregoing embodiment. Furthermore, duplicate description is omitted, and description is made mainly on differences.

Figure 6:
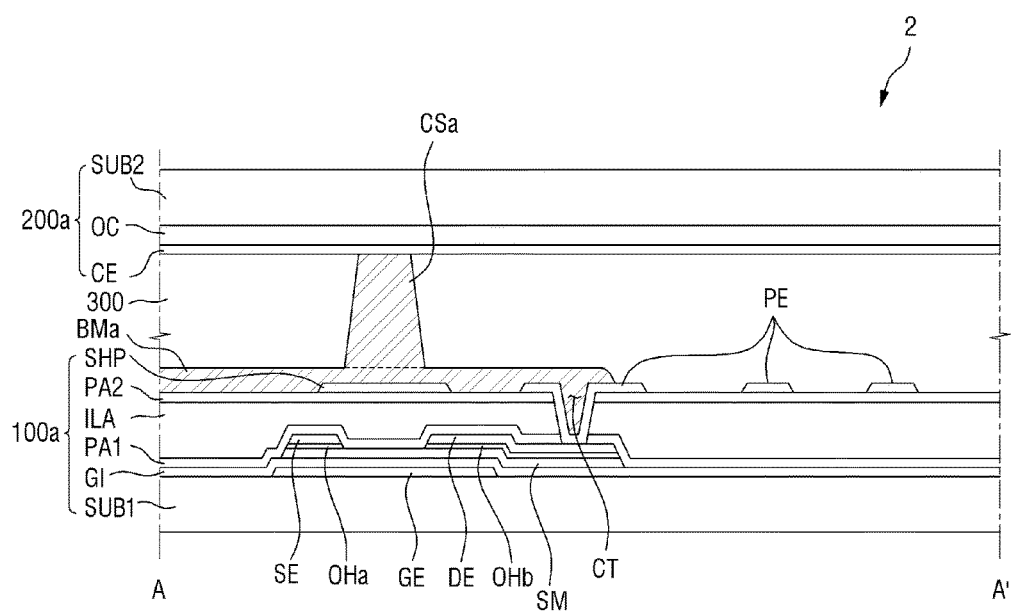
FIGS. 6, 7 and 8 are cross-sectional views illustrating modified embodiments of the liquid crystal display device shown in FIG. 1 to FIG. 4.
Figure 7:
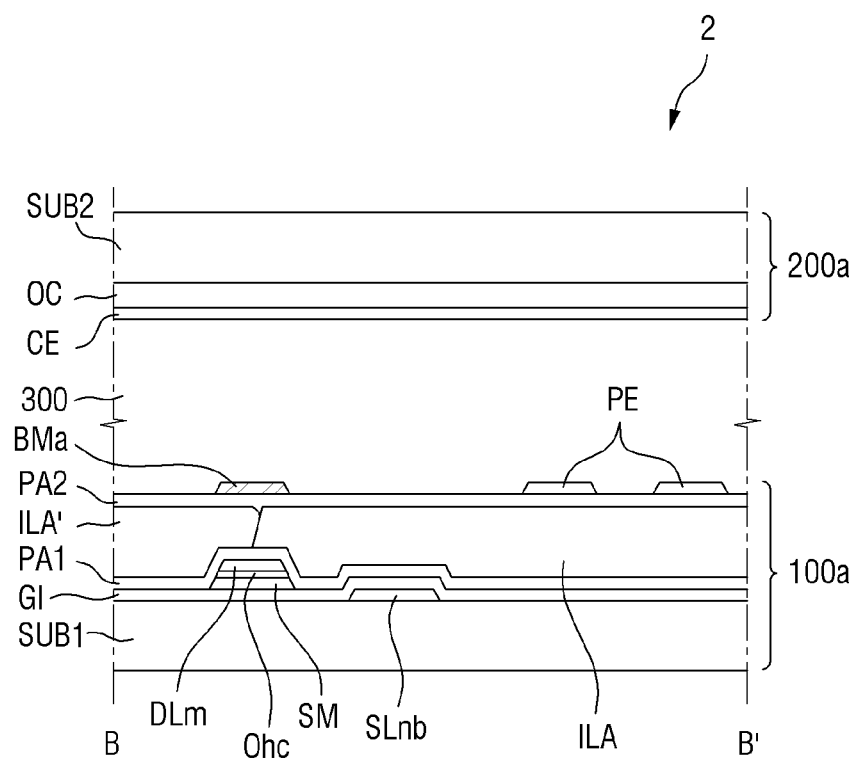
Figure 8:
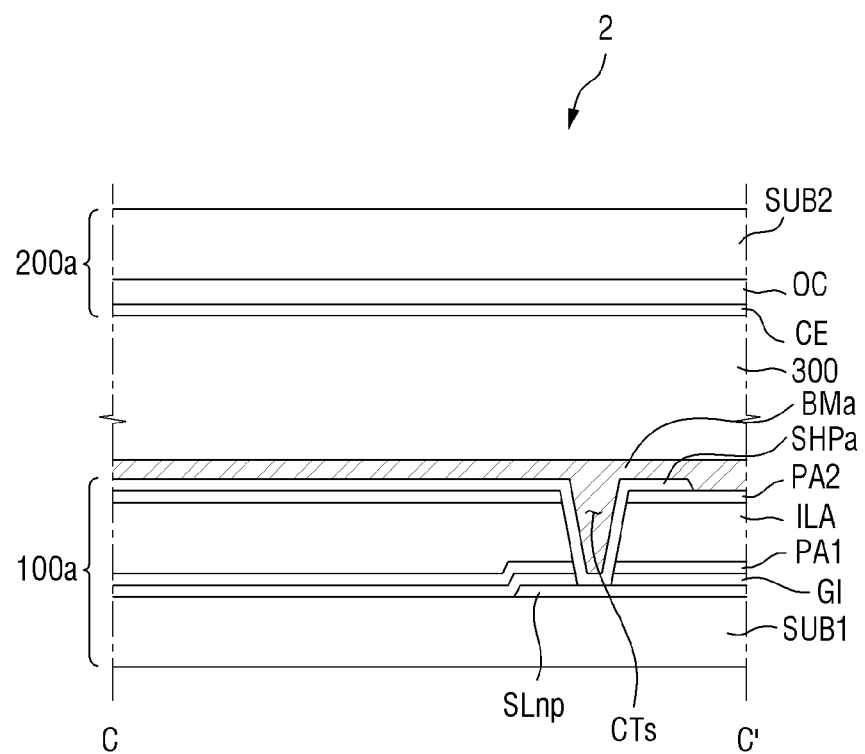

FIG. 6 to FIG. 8 are cross-sectional views illustrating modified embodiments of the liquid crystal display device shown in FIG. 1 to FIG. 4.

Referring to FIG. 6 to FIG. 8, a liquid crystal display device 2 according to the exemplary embodiment of the present inventive concept may include an array substrate 100a, an opposing substrate 200a and a liquid crystal layer 300. The liquid crystal display device 2 may further include a pair of polarizers (not shown) attached to outer surfaces of the array substrate 100a and the opposing substrate 200a.

Unlike the array substrate 100 (shown in FIG. 1 to FIG. 4) described with reference to FIG. 1 to FIG. 5, the array substrate 100a may include a light blocking member BMa.

The light blocking member BMa may be disposed on a part of the pixel electrode PE, the second passivation layer PA2 and the shield pattern SHP and may directly contact the part of the pixel electrode PE, the second passivation layer PA2 and the shield pattern SHP. The light blocking member BMa may include a part overlapped with the gate line GLn and the thin film transistor Tr, and a part overlapped with the data lines DLm and DLm+1. At least a part of the light blocking member BMa may fill the contact hole CT and the sustain electrode contact hole CTs. The light blocking member BMa may include a light blocking pigment, for example, black carbon and the like, and include a photosensitive organic material.

A spacer CSa may be disposed on the light blocking member BMa and may directly contact the light blocking member BMa. In some embodiments, the spacer CSa may include a light blocking pigment and may be made of a material same as that of the light blocking member BMa.

In some embodiments, the spacer CSa may be formed integrally with the light blocking member BMa and formed simultaneously with the light blocking member BMa by using a single photomask.

Other features of the array substrate 100a are substantially the same as those described above with reference to FIG. 1 to FIG. 5, and thus, description thereof is omitted.

The opposing substrate 200a may include a second base substrate SUB2, an overcoat layer OC and a common electrode CE but may not include a light blocking member. That is, the opposing substrate 200a differs from the opposing substrate 200 (shown in FIG. 2 to FIG. 4) described with reference to FIG. 1 to FIG. 5 in that the former does not include a light blocking member, but other features of the opposing substrate 200a may be substantially the same as those of the opposing substrate 200. Therefore, detailed description thereof is omitted.

In the liquid crystal display device 2 of the exemplary embodiment of the present inventive concept, the light blocking member BMa may be disposed on the array substrate 100a together with the thin film transistor Tr, thereby offering advantages of ease of alignment and reduced alignment error among the light blocking member BMa, the pixel electrode PE and the thin film transistor Tr. Thus, light leakage or a decrease in the aperture ratio caused by a misalignment among those components may be prevented, and transmittance may be improved.

Figure 9:
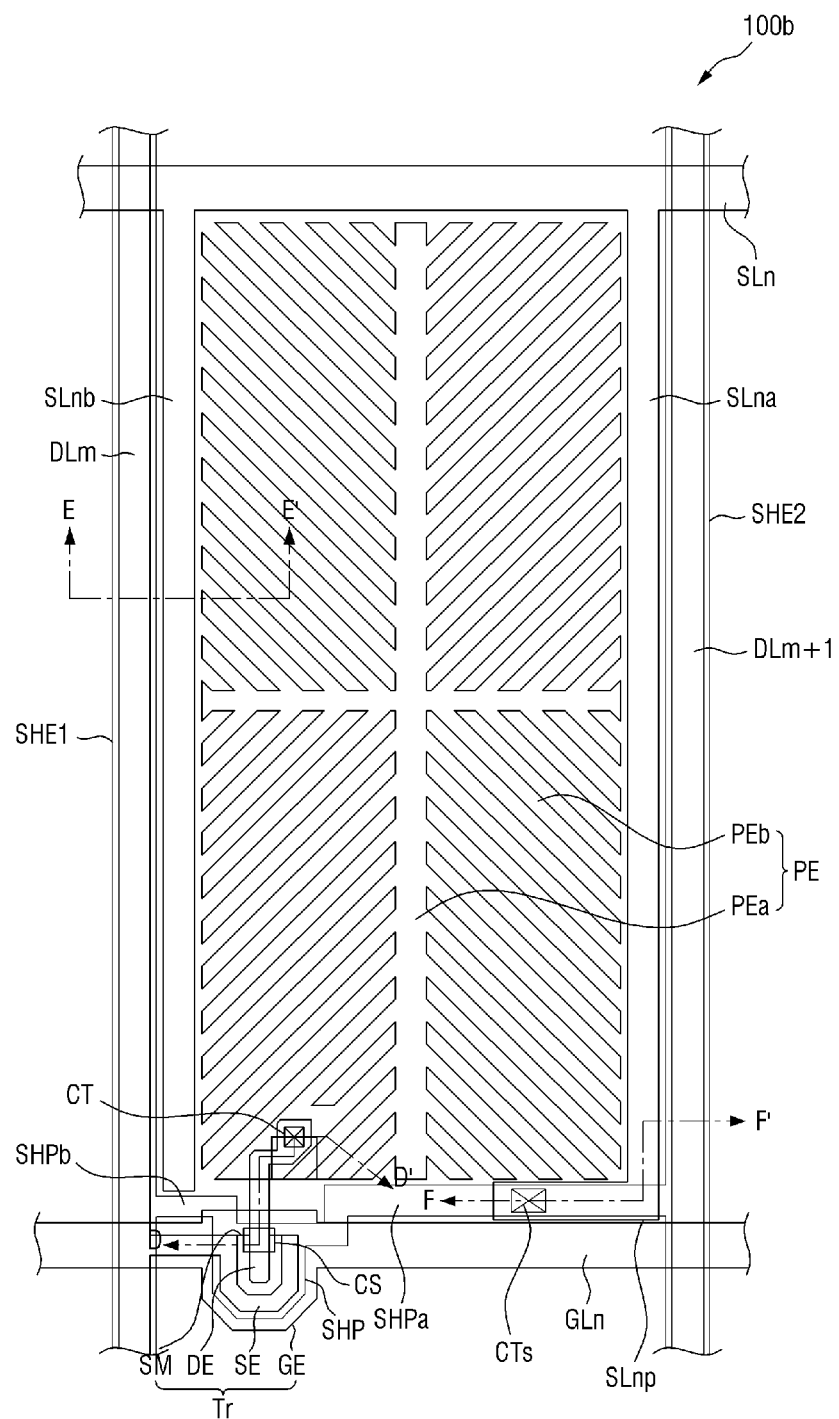
FIG. 9 is a schematic plan view illustrating an array substrate of a liquid crystal display device according to another exemplary embodiment of the present inventive concept, and more specifically, a plan view schematically illustrating the structure of one pixel.
Figure 10:
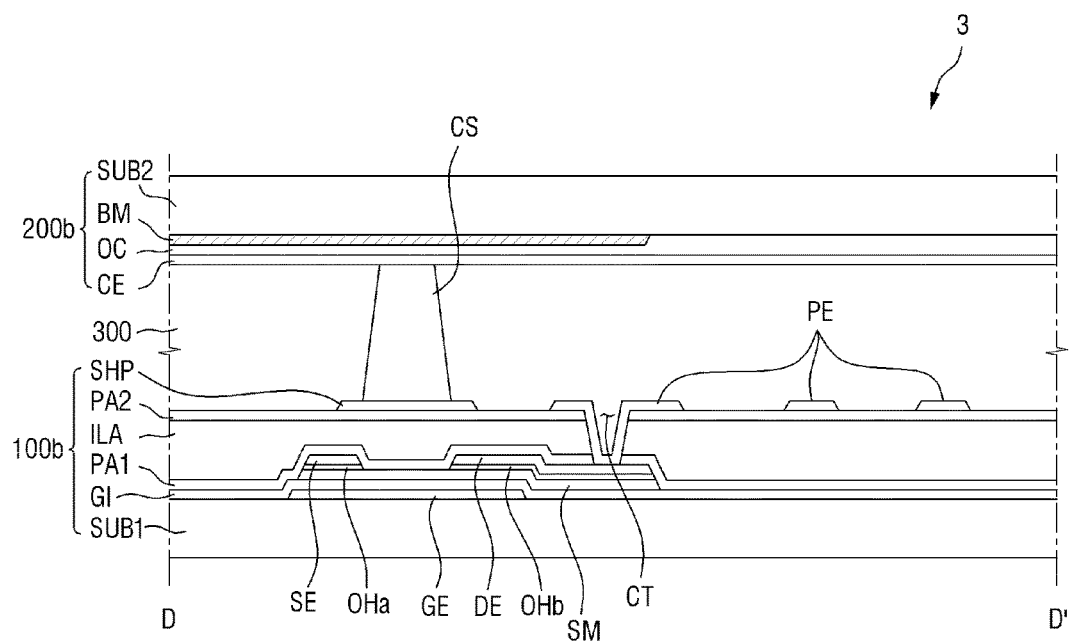
FIG. 10 is a schematic cross-sectional view taken along line D-D' of FIG. 9 and illustrates the liquid crystal display device including the array substrate of FIG. 9.
Figure 11:
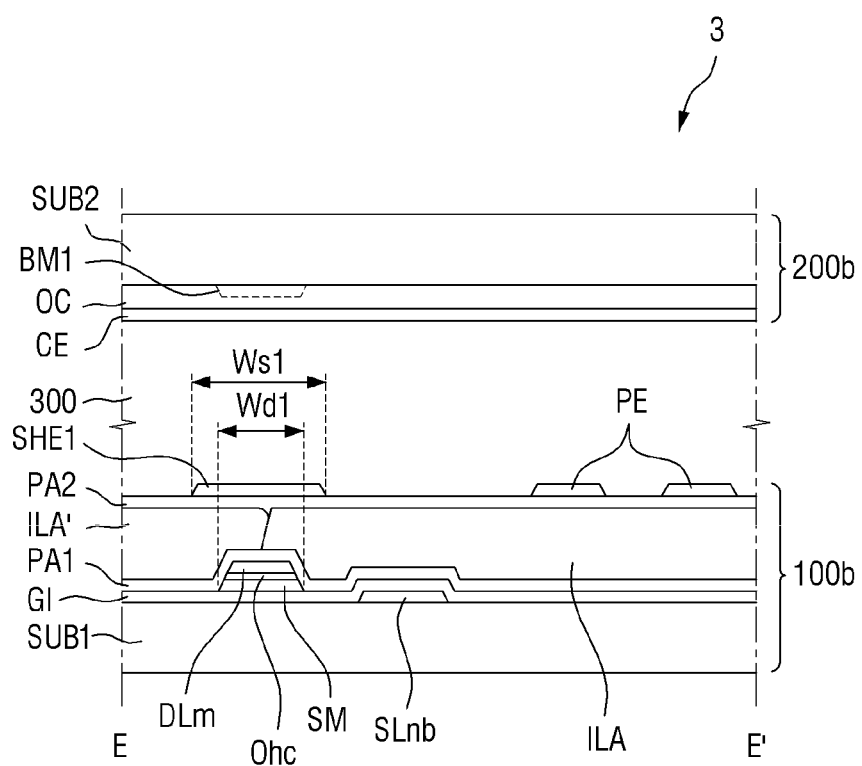
FIG. 11 is a schematic cross-sectional view taken along line E-E' of FIG. 9 and illustrates the liquid crystal display device including the array substrate of FIG. 9.
Figure 12:
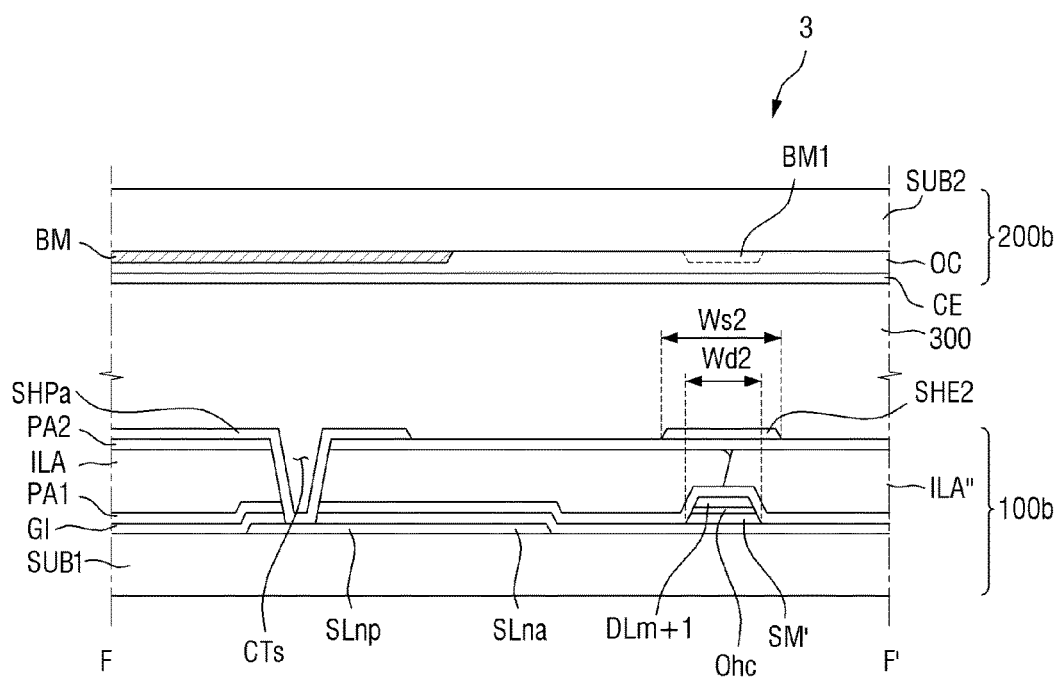
FIG. 12 is a schematic cross-sectional view taken along line F-F' of FIG. 9 and illustrates the liquid crystal display device including the array substrate of FIG. 9.

FIG. 9 is a schematic plan view illustrating an array substrate of a liquid crystal display device according to another exemplary embodiment of the present inventive concept, and more specifically, a plan view schematically illustrating the structure of one pixel. FIG. 10 is a schematic cross-sectional view taken along line D-D' of FIG. 9 and illustrates the liquid crystal display device including the array substrate of FIG. 9. FIG. 11 is a schematic cross-sectional view taken along line E-E' of FIG. 9 and illustrates the liquid crystal display device including the array substrate of FIG. 9. FIG. 12 is a schematic cross-sectional view taken along line F-F' of FIG. 9 and illustrates the liquid crystal display device including the array substrate of FIG. 9.

Referring to FIG. 9 to FIG. 12, a liquid crystal display device 3 according to the exemplary embodiment of the present inventive concept may include an array substrate 100b, an opposing substrate 200b facing the array substrate 100b, and a liquid crystal layer 300 interposed between the array substrate 100b and the opposing substrate 200b. The liquid crystal display device 3 may further include a pair of polarizers (not shown) attached to outer surfaces of the array substrate 100b and the opposing substrate 200b.

Unlike the array substrate 100 (shown in FIG. 1 to FIG. 4) described above with reference to FIG. 1 to FIG. 5, the array substrate 100b may include shield electrodes SHE1 and SHE2.

The shield electrodes SHE1 and SHE2 may be disposed on the second passivation layer PA2. Like the shield pattern SHP, the shield electrodes SHE1 and SHE2 may be physically spaced apart from the pixel electrode PE and disposed on the same layer as the pixel electrode PE. That is, like the pixel electrode PE, the shield electrodes SHE1 and SHE2 may be disposed directly on the second passivation layer PA2 and directly contact the second passivation layer PA2. The shield electrodes SHE1 and SHE2 may be made of a transparent conductive material and made of a material same as that of the shield pattern SHP and the pixel electrode PE. In some embodiments, the shield electrodes SHE1 and SHE2, the shield pattern SHP and the pixel electrode PE may be simultaneously formed in the same process by using a single mask.

The shield electrodes SHE1 and SHE2 may be disposed on a part of the second passivation layer PA2, corresponding to the data lines DLm and DLm+1, and may be overlapped with the data lines DLm and DLm+1. That is, the shield electrodes SHE1 and SHE2 may be disposed on the data lines DLm and DLm+1 and overlapped with the data lines DLm and DLm+1 and extend along the second direction (for example, the vertical direction shown in FIG. 9) in which the data lines DLm and DLm+1 extend. Hereinafter, for convenience of explanation, the electrode overlapped with the first data line DLm among the shield electrodes SHE1 and SHE2 is referred to as a first shield electrode SHE1, and the electrode overlapped with the second data line DLm+1 among the shield electrodes SHE1 and SHE2 is referred to as a second shield electrode SHE2.

When viewed in a plane, a width Ws1 of the first shield electrode SHE1 in a horizontal direction, that is, the direction in which the gate line GLn extends, may be wider than a horizontal width Wd1 of the first data line DLm. Likewise, a width Ws2 of the second shield electrode SHE2 in a horizontal direction, that is, the direction in which the gate line GLn extends, may be wider than a horizontal width Wd2 of the second data line DLm+1. Furthermore, in a plan view of the array substrate, such as in FIG. 9, the first shield electrode SHE1 may cover the first data line DLm, and the second shield electrode SHE2 may likewise cover the second data line DLm+1.

In some embodiments, a common voltage Vcom or a sustain voltage Vc may be applied to the shield electrodes SHE1 and SHE2.

In some embodiments, at least either the first shield electrode SHE1 or the second shield electrode SHE2 may be electrically connected to the shield pattern SHP. In an exemplary embodiment, the first shield pattern extension SHPa of the shield pattern SHP may contact the sustain electrode extension SLnp through the sustain electrode contact hole CTs and further extend toward the second shield electrode SHE2 to be connected to the second shield electrode SHE2. Thus, when the sustain voltage Vc is applied to the sustain electrode line SLn, the shield pattern SHP may be electrically connected to the sustain electrode line SLn and receive the sustain voltage Vc, and the second shield electrode SHE2 may likewise receive the sustain voltage Vc.

In some embodiments, the shield pattern SHP may further include a second shield pattern extension SHPb as shown in FIG. 9. The second shield pattern extension SHPb may be extended toward the first shield electrode SHE1 and electrically connected to the first shield electrode SHE1. Thus, the first shield electrode SHE1, the shield pattern SHP and the second shield electrode SHE2 may be electrically interconnected. Accordingly, when the sustain voltage Vc is applied to the shield pattern SHP, the first shield electrode SHE1 and the second shield electrode SHE2 are also supplied with the sustain voltage Vc.

The sustain voltage Vc may be substantially the same as the common voltage Vcom, or the sustain voltage Vc may have a small voltage level difference from the common voltage Vcom.

However, the connection relation among the first shield electrode SHE1, the shield pattern SHP and the second shield electrode SHE2 is not limited to those described above. In other exemplary embodiments, the first shield electrode SHE1 and the second shield electrode SHE2 may be electrically connected, and the shield pattern SHP may not be electrically connected to the first shield electrode SHE1 and the second shield electrode SHE2. Alternatively, only either the first shield electrode SHE1 or second shield electrode SHE2 may be electrically connected to the shield pattern SHP. Alternatively, all of the first shield electrode SHE1, the second shield electrode SHE2 and the shield pattern SHP may not be electrically connected to each other.

Furthermore, the path for providing voltages to the first shield electrode SHE1, the shield pattern SHP and the second shield electrode SHE2 is not limited to those described above. For example, in other exemplary embodiments, the common voltage Vcom may be provided to at least any one of the first shield electrode SHE1, the shield pattern SHP and the second shield electrode SHE2 through a separate terminal.

In some embodiments, at least any one of the first shield electrode SHE1, the second shield electrode SHE2 and the shield pattern SHP may be in a floated state.

Other features of the array substrate 100*b* are substantially the same as those described above with reference to FIG. 1 to FIG. 5, and thus description thereof is omitted.

The opposing substrate 200*b* may include a second base substrate SUB2, a light blocking member BM, an overcoat layer OC and a common electrode CE.

In some embodiments, the light blocking member BM may include a part overlapped with the gate line GLn and the thin film transistor Tr. Furthermore, a part BM1 of the light blocking member BM overlapped with the data lines DLm and DLm+1 may be omitted, or an area of the part BM1 may be decreased. The other components are substantially the same as those described above with reference to FIG. 1 to FIG. 5, and thus description thereof is omitted.

An electric field generated between the pixel electrode PE and the common electrode CE may be relatively weak in a region between the data lines DLm, DLm+1 and the pixel electrode PE, and thus the likelihood of misalignment of liquid crystal molecules may be high in the region.

In the liquid crystal display device 3 according to the exemplary embodiment of the present inventive concept, the sustain voltage Vc may be applied to the shield electrodes SHE1 and SHE2 as well as to the shield pattern SHP, or a voltage having a level same as that of the voltage applied to the common electrode CE, for example, the common voltage Vcom, may be applied to the shield electrodes SHE1 and SHE2 and the shield pattern SHP. In such case, no electric field would be generated between the common electrode CE and the shield electrodes SHE1 and SHE2, or even if an electric field is generated therebetween, the intensity of the electric field would be low. Therefore, the probability of misalignment of the liquid crystal molecules disposed in a region adjacent to the data lines DLm and DLm+1 may be lowered. Thus, light leakage caused by the misalignment of liquid crystal molecules in the vicinity of the data lines DLm and DLm+1 may be reduced, and an area of the light blocking member BM disposed to prevent the light leakage may further be reduced. Thus, an aperture ratio of the liquid crystal display device 3 may further be increased.

Furthermore, an electric field generated between the data lines DLm and DLm+1 and the pixel electrode PE may be weakened by the shield electrodes SHE1 and SHE2, thus providing advantages of suppressed crosstalk defects.

Figure 13:
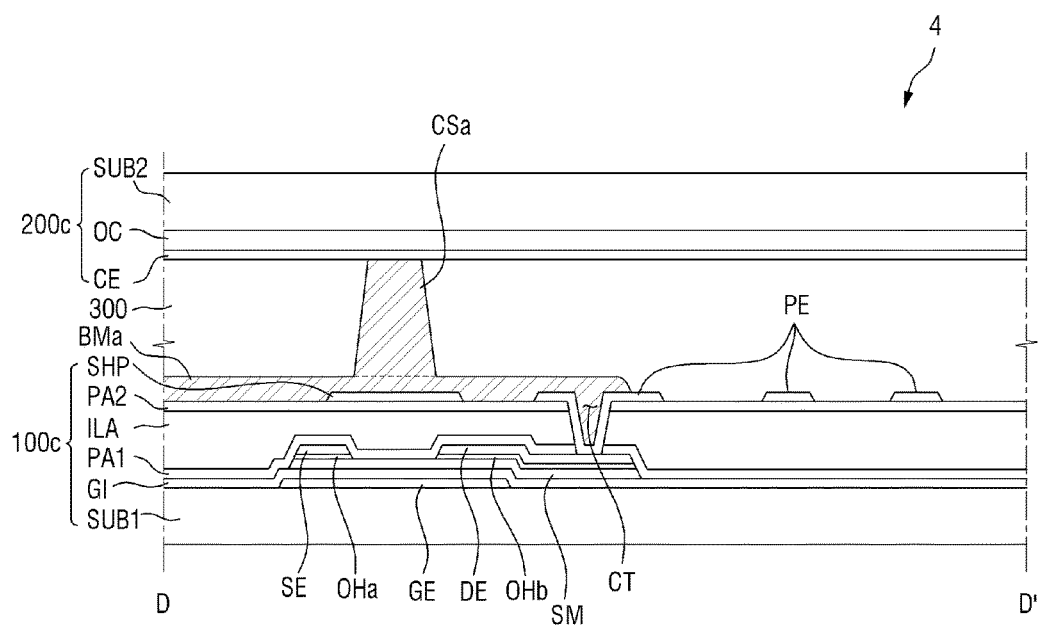
FIGS. 13, 14 and 15 are cross-sectional views illustrating modified embodiments of the liquid crystal display device shown in FIG. 9 to FIG. 12.
Figure 14:
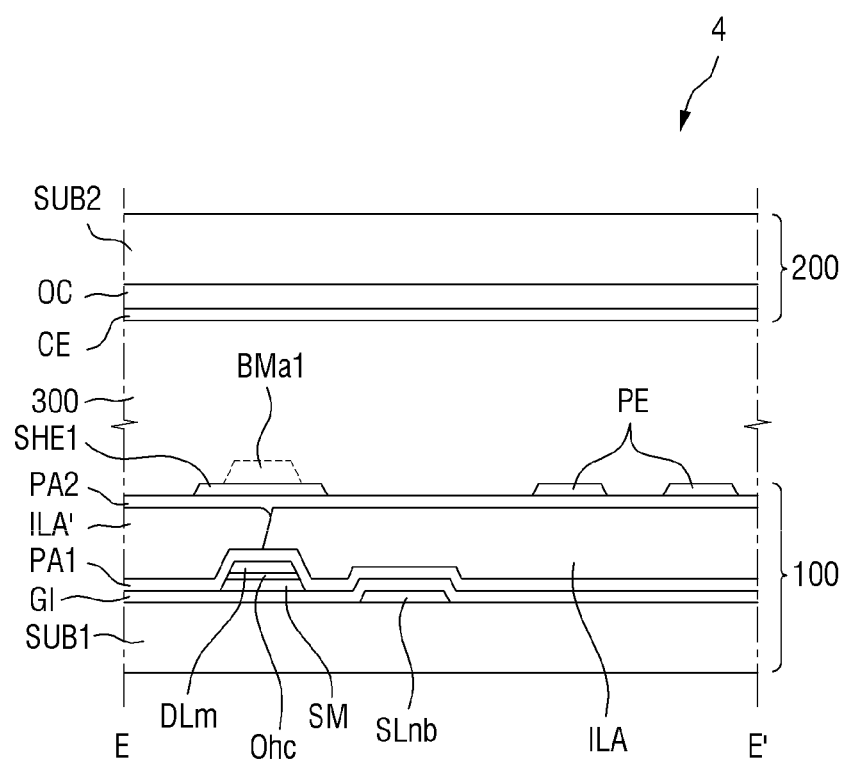
Figure 15:
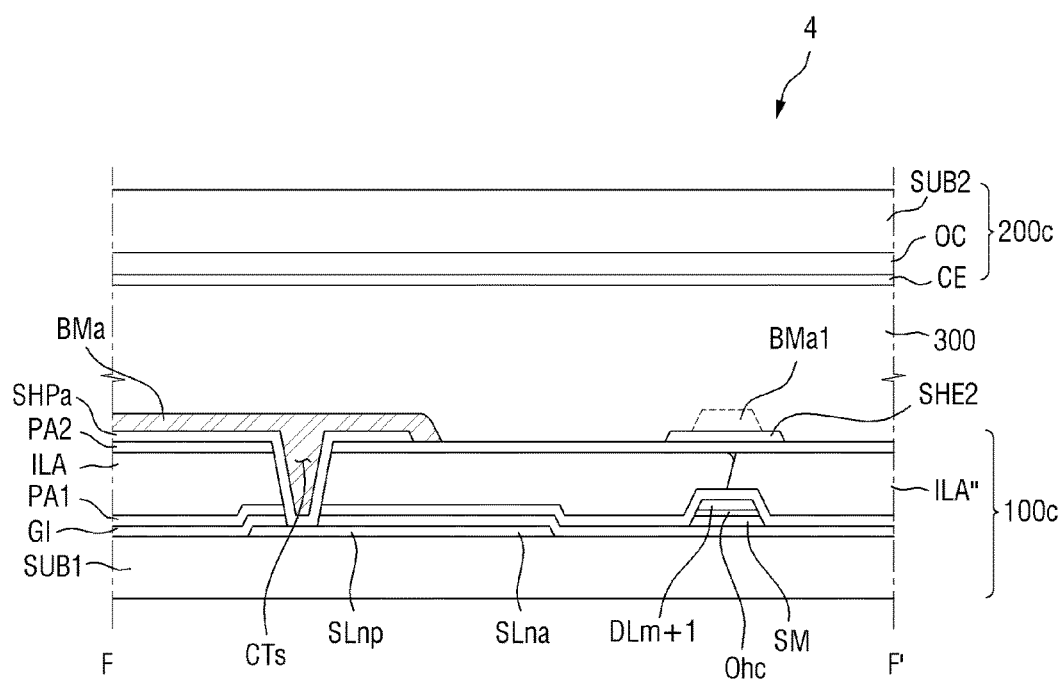

FIG. 13 to FIG. 15 are cross-sectional views illustrating modified embodiments of the liquid crystal display device shown in FIG. 9 to FIG. 12.

Referring to FIG. 13 to FIG. 15, a liquid crystal display device 4 according to the exemplary embodiment of the present inventive concept may include an array substrate 100*c*, an opposing substrate 200*c* and a liquid crystal layer 300. The liquid crystal display device 4 may further include a pair of polarizers (not shown) attached to outer surfaces of the array substrate 100*c* and the opposing substrate 200*c*.

Unlike the array substrate 100*b* (shown in FIG. 9 to FIG. 12) described with reference to FIG. 9 to FIG. 12, the array substrate 100*c* may include a light blocking member BMa.

The light blocking member BMa may be disposed on a part of the pixel electrode PE, the second passivation layer PA2 and the shield pattern SHP and may directly contact the part of the pixel electrode PE, the second passivation layer PA2 and the shield pattern SHP. The light blocking member BMa may include a part overlapped with the gate line GLn and the thin film transistor Tr. A part BMa1 of the light blocking member BMa overlapped with the data lines DLm and DLm+1 may be omitted, or an area of the part BMa1 may be reduced. At least a part of the light blocking member BMa may fill the contact hole CT and the sustain electrode contact hole CTs. The light blocking member BMa may include a light blocking pigment, for example, black carbon and the like, and include a photosensitive organic material.

The spacer CSa may be disposed on the light blocking member BMa and may directly contact the light blocking member BMa. In some embodiments, the spacer CSa may include a light blocking pigment and may be made of a material same as that of the light blocking member BMa.

In some embodiments, the spacer CSa may be formed integrally with the light blocking member BMa and formed simultaneously with the light blocking member BMa by using a single photomask.

Other features of the array substrate 100c are substantially the same as those described above with reference to FIG. 9 to FIG. 12, and thus description thereof is omitted.

The opposing substrate 200c may include a second base substrate SUB2, an overcoat layer OC and a common electrode CE but may not include a light blocking member. That is, the opposing substrate 200c differs from the opposing substrate 200b (shown in FIG. 9 to FIG. 12) described with reference to FIG. 9 to FIG. 12 in that the former does not include a light blocking member, but other features of the opposing substrate 200c may be substantially the same as those of the opposing substrate 200b. Therefore, detailed description thereof is omitted.

In the liquid crystal display device 4 of the exemplary embodiment of the present inventive concept, the light blocking member BMa may be disposed on the array substrate 100c together with the thin film transistor Tr, thereby offering advantages of ease of alignment and reduced alignment error among the light blocking member BMa, the pixel electrode PE and the thin film transistor Tr. Thus, light leakage or a decrease in the aperture ratio caused by a misalignment among those components may be prevented, and transmittance may be improved.

Figure 16:
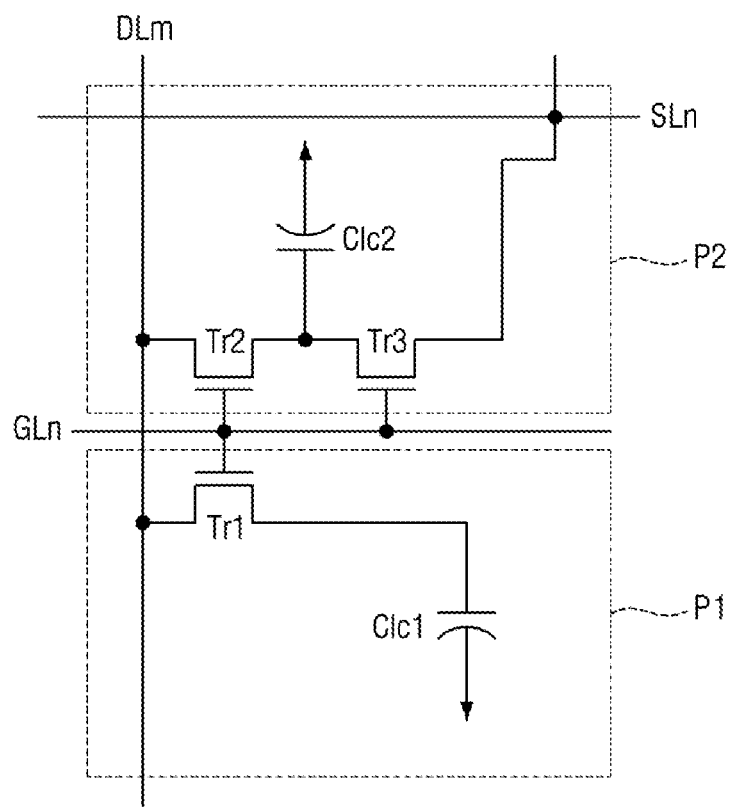
FIG. 16 an equivalent circuit diagram illustrating one pixel of a liquid crystal display device according to yet another exemplary embodiment of the present inventive concept.

FIG. 16 an equivalent circuit diagram illustrating one pixel of a liquid crystal display device according to yet another exemplary embodiment of the present inventive concept.

Referring to FIG. 16, one pixel of the liquid crystal display device according to yet another exemplary embodiment of the present inventive concept may include two subpixels P1 and P2. Furthermore, one pixel of the liquid crystal display device according to yet another embodiment of the present inventive concept may include a gate line GLn that transmits a gate signal, a data line DLm that transmits a data voltage, a sustain electrode line SLn to which a constant sustain voltage Vc is applied, a first thin film transistor Tr1, a second thin film transistor Tr2 and a third thin film transistor Tr3.

The first thin film transistor Tr1 and the second thin film transistor Tr2 may be connected to the same gate line GLn and the same data line DLm. Furthermore, the third thin film transistor Tr3 may be connected to the same gate line GLn as the first thin film transistor Tr1 and the second thin film transistor Tr2, the second thin film transistor Tr2 and the sustain electrode line SLn.

One pixel may include two subpixels P1 and P2. The first subpixel P1 may include a first liquid crystal capacitor Clc1 connected to the first thin film transistor Tr1, and the second subpixel P2 may include a second liquid crystal capacitor Clc2 connected to the second thin film transistor Tr2.

The first thin film transistor Tr1 may be included in the first subpixel P1, and the second and third thin film transistors Tr2 and Tr3 may be included in the second subpixel P2.

The first thin film transistor Tr1 may have a first terminal connected to the gate line GLn, a second terminal connected to the data line DLm, and a third terminal connected to the first liquid crystal capacitor Clc1.

Specifically, the third terminal of the first thin film transistor Tr1 may be connected to a first subpixel electrode (not shown in the drawing) of the first liquid crystal capacitor Clc1.

The second thin film transistor Tr2 may have a first terminal connected to the gate line GLn, a second terminal connected to the data line DLm, and a third terminal connected to the second liquid crystal capacitor Clc2.

Specifically, the third terminal of the second thin film transistor Tr2 may be connected to a second subpixel electrode (not shown in the drawing) of the second liquid crystal capacitor Clc2.

The third thin film transistor Tr3 may have a first terminal connected to the gate line GLn, a second terminal connected to the sustain electrode line SLn, and a third terminal connected to the third terminal of the second thin film transistor Tr2.

A liquid crystal display device according to an exemplary embodiment of the present inventive concept may operate as follows. When a gate on voltage is applied to the gate line GLn, all of the first, the second and the third thin film transistors Tr1, Tr2 and Tr3 connected to the gate line GLn may be turned on, and the first liquid crystal capacitor Clc1 and the second liquid crystal capacitor Clc2 may be charged with the data voltage transmitted through the data line DLm.

Although the same data voltage is applied to the subpixels P1 and P2, because the third thin film transistor Tr3 is in a turned-on state, the data voltage transmitted to the second subpixel P2 through the data line DLm may be divided through the third thin film transistor Tr3 connected in series to the second thin film transistor Tr2. In this case, the voltage may be distributed based on the size of channels of the second thin film transistor Tr2 and the third thin film transistor Tr3. Thus, even when the same data voltage is transmitted to the first subpixel P1 and the second subpixel P2 through the data line DLm, the voltages charging the first liquid crystal capacitor Clc1 and the second liquid crystal capacitor Clc2 may be different from each other. That is, the voltage charging the second liquid crystal capacitor Clc2 may be lower than the voltage charging the first liquid crystal capacitor Clc1, which is the difference between common voltage Vcom and the data voltage.

Consequently, the voltages charging the first subpixel P1 and the second subpixel P2 in one pixel may be different from each other, which improves side visibility. In this case, the sustain voltage Vc may have a level higher than the level of the common voltage Vcom. For example, when the common voltage Vcom is approximately 7V, the sustain voltage Vc may be approximately 8V, but the present disclosure is not limited thereto.

Figure 17:
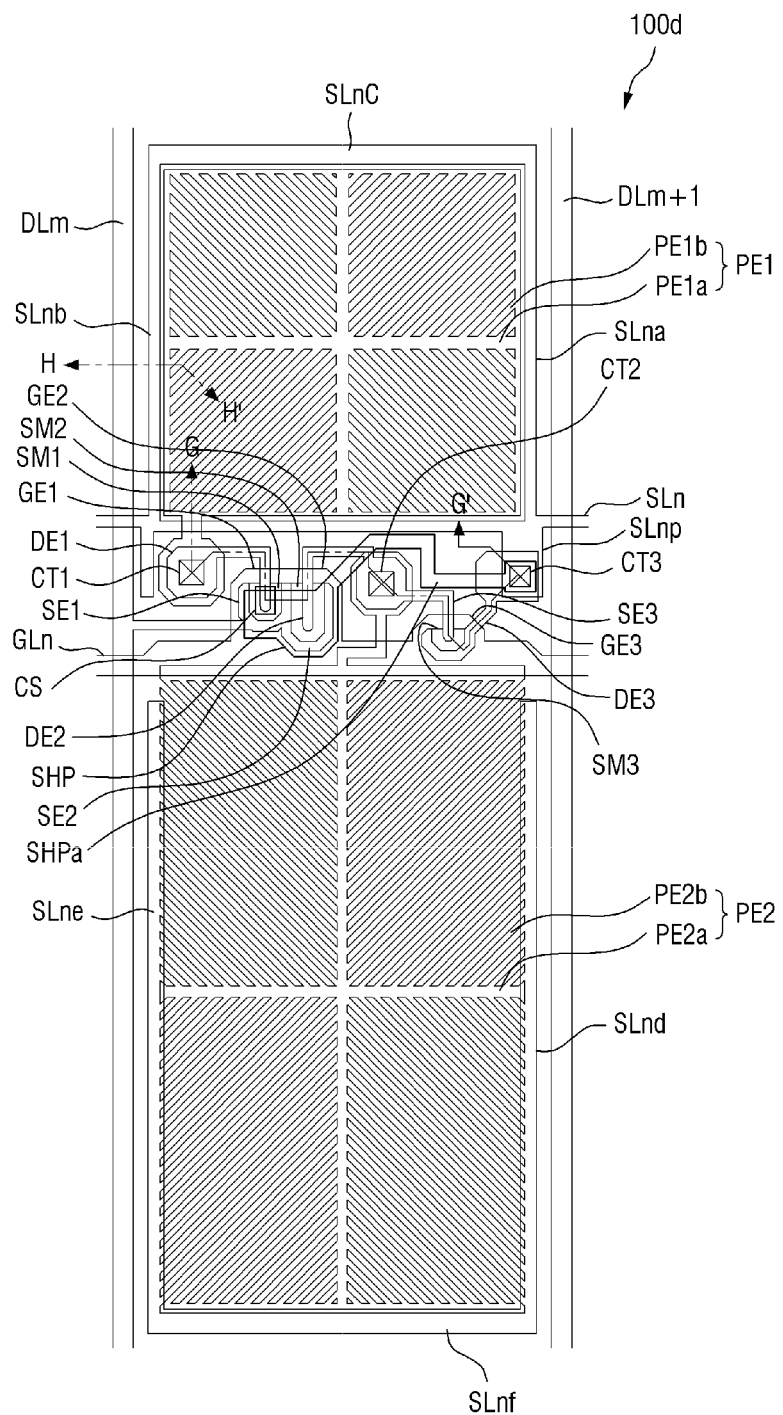
FIG. 17 is a schematic plan view illustrating an array substrate of a liquid crystal display device according to still another exemplary embodiment of the present inventive concept, and more specifically, a plan view schematically illustrating the structure of one pixel.
Figure 18:
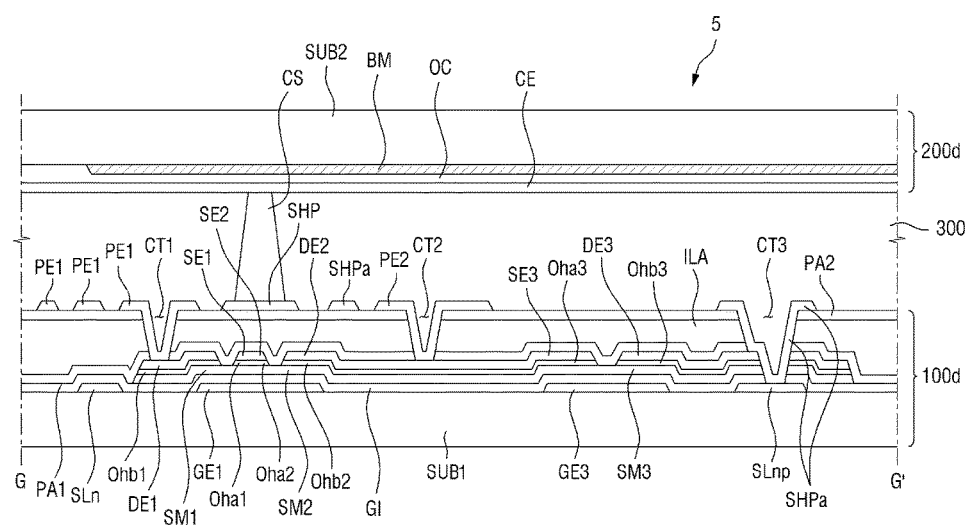
FIG. 18 is a schematic cross-sectional view taken along line G-G' of FIG. 17 and illustrates the liquid crystal display device including the array substrate of FIG. 17.
Figure 19:
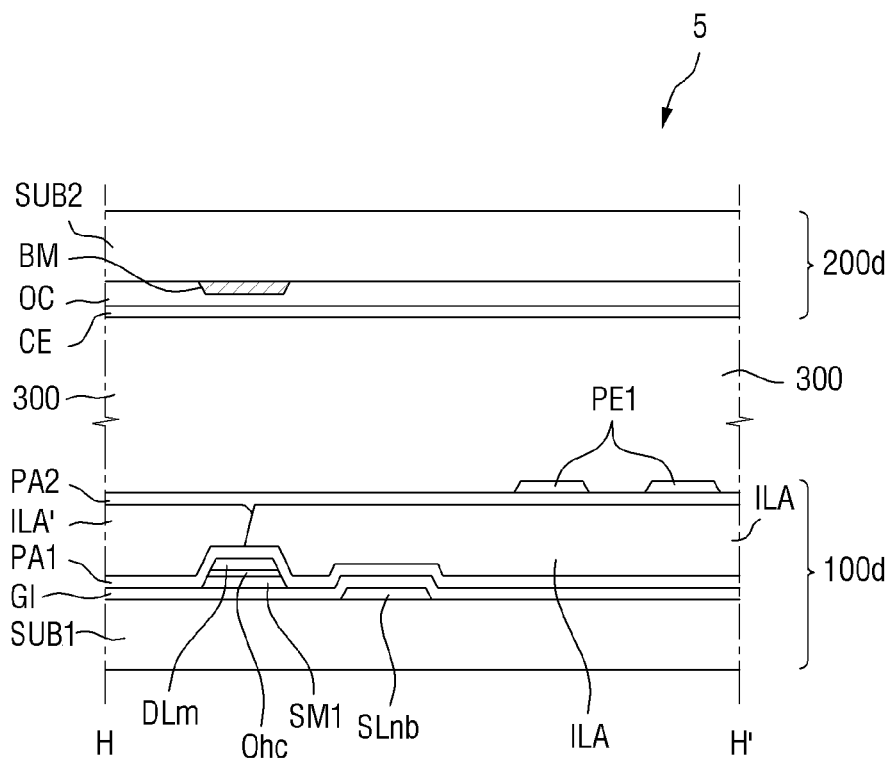
FIG. 19 is a schematic cross-sectional view taken along line H-H' of FIG. 17 and illustrates the liquid crystal display device including the array substrate of FIG. 17.

FIG. 17 is a schematic plan view illustrating an array substrate of a liquid crystal display device according to still another exemplary embodiment of the present inventive concept, and more specifically, a plan view schematically illustrating the structure of one pixel shown in FIG. 16. FIG. 18 is a schematic cross-sectional view taken along line G-G' of FIG. 17 and illustrates the liquid crystal display device including the array substrate of FIG. 17. FIG. 19 is a schematic cross-sectional view taken along line H-H' of FIG. 17 and illustrates the liquid crystal display device including the array substrate of FIG. 17.

Referring to FIG. 17 to FIG. 19, a liquid crystal display device 5 according to the still another exemplary embodiment of the present inventive concept may include an array substrate 100d, an opposing substrate 200d facing the array substrate 100d, and a liquid crystal layer 300 interposed between the array substrate 100d and the opposing substrate 200d, and may further include a pair of polarizers (not shown) attached to outer surfaces of the array substrate 100d and the opposing substrate 200d.

The array substrate 100d is now described.

The gate line GLn may be disposed on the first base substrate SUB1 made of transparent glass, plastic or the like. The gate line GLn may mainly extend in the first direction (for example, the horizontal direction of FIG. 17), and transmit a gate signal.

A first gate electrode GE1 and a second gate electrode GE2, which protrude from the gate line GLn and are connected with each other, may be disposed on the first base substrate SUB1. Furthermore, a third gate electrode GE3, which protrudes from the gate line GLn and is spaced apart from the first gate electrode GE1 and the second gate electrode GE2, may be disposed on the first base substrate SUB1. The first, the second and the third gate electrodes GE1, GE2 and GE3 may be connected to the same gate line GLn, and the same gate signal may be applied to the first, the second and the third gate electrodes GE1, GE2 and GE3.

The gate insulation layer GI may be disposed on the gate line GLn and the first, the second and the third gate electrodes GE1, GE2 and GE3. The gate insulation layer GI may be made of an inorganic insulation material, for example, silicon oxide, silicon nitride, silicon oxynitride and the like. The gate insulation layer GI may be formed to have a single layer structure or a multi-layer structure.

A first semiconductor layer SM1, a second semiconductor layer SM2 and a third semiconductor layer SM3 may be formed on the gate insulation layer GI. The first semiconductor layer SM1 may be disposed on the first gate electrode GE1, the second semiconductor layer SM2 may be disposed on the second gate electrode GE2, and the third semiconductor layer SM3 may be disposed on the third gate electrode GE3. Each of the first second semiconductor layer SM1, the second semiconductor layer SM2 and the third semiconductor layer SM3 may include amorphous silicon, polycrystalline silicon or oxide semiconductor.

A plurality of ohmic contact members Oha1, Oha2, Oha3, Ohb1, Ohb2, Ohb3 and Ohc may be disposed on the first semiconductor layer SM1, the second semiconductor layer SM2 and the third semiconductor layer SM3. The plurality of ohmic contact members Oha1, Oha2, Oha3, Ohb1, Ohb2, Ohb3 and Ohc may include source ohmic contact members Oha1, Oha2 and Oha3 provided beneath the first, the second and the third source electrodes SE1, SE2 and SE3, which are described later, drain ohmic contact members Ohb1, Ohb2 and Ohb3 provided beneath the first, the second and the third drain electrodes DE1, DE2 and DE3, and a data ohmic contact member Ohc provided beneath the data lines DLm and DLm+1. In some embodiments, when the first semiconductor layer SM1, the second semiconductor layer SM2 and the third semiconductor layer SM3 are oxide semiconductors, the ohmic contact members Oha1, Oha2, Oha3, Ohb1, Ohb2, Ohb3 and Ohc may be omitted.

The data lines DLm and DLm+1, the first source electrode SE1, the first drain electrode DE1, the second source electrode SE2, the second drain electrode DE2, the third source electrode SE3 and the third drain electrode DE3 may be formed on the ohmic contact members Oha1, Oha2, Oha3, Ohb1, Ohb2, Ohb3 and Ohc and the gate insulation layer GI.

The data lines DLm and DLm+1 may transmit data voltages and mainly extend in the second direction (for example, the vertical direction of FIG. 17) so as to intersect the gate line GLn.

The first source electrode SE1 may protrude from the data line DLm to overlap the first gate electrode GE1. The first source electrode SE1 may have a C shape above the first gate electrode GE1.

The first drain electrode DE1 may be spaced apart from the first source electrode SE1 above the first gate electrode GE1. A channel may be formed in a part of the first semiconductor layer SM1 exposed through the gap between the first source electrode SE1 and the first drain electrode DE1 spaced apart from each other.

The second source electrode SE2 may protrude from the data line DLm to overlap the second gate electrode GE2. The second source electrode SE2 may have a C shape above the second gate electrode GE2.

The second drain electrode DE2 may be spaced apart from the second source electrode SE2 above the second gate electrode GE2. A channel may be formed in a part of the second semiconductor layer SM2 exposed through the gap between the second source electrode SE2 and the second drain electrode DE2 spaced apart from each other.

The third source electrode SE3 may be connected to the second drain electrode DE2 and spaced apart from the third drain electrode DE3 above the third gate electrode GE3. A channel may be formed in a part of the third semiconductor layer SM3 exposed through the gap between the third source electrode SE3 and the third drain electrode DE3 spaced apart from each other.

The drain electrode DE3 may overlap the third gate electrode GE3. The third drain electrode DE3 may be connected to the sustain electrode line SLn, which is described later, and receive a constant voltage, for example, sustain voltage Vc applied thereto.

The first gate electrode GE1, the first semiconductor layer SM1, the first source electrode SE1 and the first drain electrode DE1 described above may form the first thin film transistor Tr1. Furthermore, the second gate electrode GE2, the second semiconductor layer SM2, the second source electrode SE2 and the second drain electrode DE2 may form the second thin film transistor Tr2, and the third gate electrode GE3, the third semiconductor layer SM3, the third source electrode SE3 and the third drain electrode DE3 may form the third thin film transistor Tr3.

The first passivation layer PA1 may be disposed on the data lines DLm and DLm+1, the first, the second and the third source electrodes SE1, SE2 and SE3 and the first, the second and the third drain electrodes DE1, DE2 and DE3. The first passivation layer PA1 may be made of an organic insulation material or an inorganic insulation material. The first passivation layer PA1 protects the first, the second and the third thin film transistors Tr1, Tr2 and Tr3 and prevents the substance contained in the insulation layer ILA, which is described later, from being introduced into the first, the second and the third semiconductor layers SM1, SM2 and SM3.

The insulation layer ILA may be disposed on the first passivation layer PA1. In some embodiments, the insulation layer ILA may planarize an upper portion of the first passivation layer PA1. The insulation layer ILA may include an organic material, and in some embodiments, a photosensitive organic material. The insulation layer ILA may further include a color pigment. For example, the insulation layer ILA may include a color pigment that passes light of a wavelength range corresponding to a specific color. That is, the insulation layer ILA may be a color filter. When the insulation layer ILA includes a color pigment, the insulation layer ILA may be at least partially overlapped with insulation layers ILA' and ILA" of neighboring pixels above the data lines DLm and DLm+1.

The second passivation layer PA2 may be provided on the insulation layer ILA. The second passivation layer PA2 may include an inorganic insulation material, such as silicon oxide, silicon nitride, silicon oxynitride and the like. The second passivation layer PA2 prevents the insulation layer ILA from coming off and prevents a material contained in the insulation layer ILA from being introduced into the liquid crystal layer 300.

A first contact hole CT1 that exposes a part of the first drain electrode DE1 and a second contact hole CT2 that exposes a part of the second drain electrode DE2 may be formed in the first passivation layer PA1, the insulation layer ILA and the second passivation layer PA2.

The pixel electrodes PE1 and PE2 may be disposed on the insulation layer ILA and the second passivation layer PA2. The pixel electrodes PE1 and PE2 may include a first subpixel electrode PE1 and a second subpixel electrode PE2. The first subpixel electrode PE1 may be connected to the first drain electrode DE1 through the first contact hole CT1, and the second subpixel electrode PE2 may be connected to the second drain electrode DE2 through the second contact hole CT2.

The first subpixel electrode PE1 and the second subpixel electrode PE2 may receive a data voltage respectively from the first drain electrode DE1 and the second drain electrode DE2. In this case, a part of the data voltage applied to the second drain electrode DE2 may be divided through the third source electrode SE3. Thus, when the data voltages applied to the first subpixel electrode PE1 and the second subpixel electrode PE2 are positive (+), the magnitude of the second subpixel voltage applied to the second subpixel electrode PE2 may be smaller than the magnitude of the first subpixel voltage applied to the first subpixel electrode PE1. Oppositely, when the data voltages applied to the first subpixel electrode PE1 and the second subpixel electrode PE2 are negative (−), the magnitude of the first subpixel voltage applied to the first subpixel electrode PE1 may be smaller than the magnitude of the second subpixel voltage applied to the second subpixel electrode PE2.

The first subpixel electrode PE1 may include a first stem PE1*a* and a plurality of first branches PE1*b* radially protruding and extending from the first stem PE1*a*. The first stem PE1*a* may be formed into various shapes. For example, as shown in FIG. 17, the first stem PE1*a* may have a cross shape. In this case, the first subpixel may be divided into four domains by the first stem PE1*a*.

The first branches PE1*b* may extend in different directions in each domain. The first branches PE1*b* may be extended in parallel with each other and spaced apart from each other in each domain defined by the first stem PE1*a*. The first branches PE1*b* adjacent each other may be spaced apart on a micrometer spacing basis so as to form a plurality of fine slits.

The first subpixel electrode PE1 may be made of a transparent conductive material, such as ITO, IZO, ITZO and AZO.

Liquid crystal molecules of the liquid crystal layer 300 of the first subpixel may be pretilted in different directions in each domain by the plurality of fine slits. For example, the directions along which the liquid crystal molecules tilt may be four directions headed toward the first stem PE1*a*. Thus, four domains in which liquid crystal molecules are aligned in different directions may be formed in the liquid crystal layer 300. As described above, varying the direction along which the liquid crystal molecules tilt may enable the display device 5 including the liquid crystal layer 300 to have a wide reference view angle.

The second subpixel electrode PE2 may include a second stem PE2*a* and a plurality of second branches PE2*b* radially protruding and extending from the second stem PE2*a*. That is, the second subpixel electrode PE2 may have a configuration substantially the same as that of the subpixel electrode PE1. Therefore, detailed description of the configuration of the second subpixel electrode PE2 is omitted.

In some embodiments, the second subpixel electrode PE2 may have an area larger than the area of the first subpixel electrode PE1.

The sustain electrode line SLn may further be disposed on the first base substrate SUB1. The sustain electrode line SLn may extend in the direction (for example, the horizontal direction) substantially the same as that of the gate line GLn. The sustain electrode line SLn may be formed to enclose at least a part of the pixel electrode PE, which is described later. For example, the sustain electrode line SLn may further include a first sustain electrode SLna, a second sustain electrode SLnb and a third sustain electrode SLnc enclosing a part of the first subpixel electrode PE1. Furthermore, the sustain electrode line SLn may further include a sustain electrode extension SLnp extending from the first sustain electrode SLna or the second sustain electrode SLnb. The sustain electrode line SLn may further include a fourth sustain electrode SLnd, a fifth sustain electrode SLne and a sixth sustain electrode SLnf enclosing a part of the second subpixel electrode PE2. In some embodiments, the sustain electrode extension SLnp may extend to the region between the pixel electrode PE and the gate line GLn when seen in a plan view. Furthermore, in some embodiments, the first sustain electrode SLna, the second sustain electrode SLnb, the fourth sustain electrode SLnd and the fifth sustain electrode SLne may be interposed between the pixel electrode PE and the data lines DLm and DLm+1 when seen in a plan view.

In an exemplary embodiment, the sustain electrode line SLn may be disposed on the same layer and made of the same material as the gate line GLn and the first, the second and third gate electrodes GE1, GE2 and GE3. That is, in the exemplary embodiment, the sustain electrode line SLn may be interposed between the first base substrate SUB1 and the gate insulation layer GI and made of a material same as that of the gate line GLn.

The shield pattern SHP may be disposed on the second passivation layer PA2. The shield pattern SHP may be physically spaced apart from the pixel electrodes PE1 and PE2 and disposed on the same layer as the pixel electrodes PE1 and PE2. That is, like the pixel electrodes PE1 and PE2, the shield pattern SHP may be disposed directly on the second passivation layer PA2 and directly contact the second passivation layer PA2. The shield pattern SHP may be made of a transparent conductive material and made of a material same as that of the pixel electrodes PE1 and PE2. In some embodiments, the shield pattern SHP and the pixel electrodes PE1 and PE2 may be simultaneously formed in the same process by using a single mask.

The shield pattern SHP may be overlapped with at least either the first thin film transistor Tr1 or the second thin film transistor Tr2 when seen in a plan view. In an exemplary embodiment, the shield pattern SHP may be overlapped with both the first thin film transistor Tr1 and the second thin film transistor Tr2. Furthermore, the shield pattern SHP may be overlapped with the first source electrode SE1, the first drain electrode DE1, the second source electrode SE2 and the second drain electrode DE2. However, the present disclosure is not limited thereto, and the shield pattern SHP may be overlapped with only either the first thin film transistor Tr1 or the second thin film transistor Tr2 in some cases.

In some embodiments, the common voltage Vcom or the sustain voltage Vc may be applied to the shield pattern SHP.

The shield pattern SHP may further include a first shield pattern extension SHPa. The first shield pattern extension SHPa may extend toward the sustain electrode extension SLnp and contact the sustain electrode extension SLnp through a sustain electrode contact hole CT3, which is a third contact hole formed in the gate insulation layer GI, the first passivation layer PA1, the insulation layer ILA and the second passivation layer PA2. Thus, when the sustain voltage Vc is applied to the sustain electrode line SLn, the shield pattern SHP may be electrically connected to the sustain electrode line SLn and receive the sustain voltage Vc applied thereto. The sustain voltage Vc may be substantially the same as the common voltage Vcom or may have a small voltage level difference from the common voltage Vcom.

Furthermore, the first shield pattern extension SHPa may contact the third drain electrode DE3 through the sustain electrode contact hole CT3. That is, the first shield pattern extension SHPa may function as a connection electrode for electrically interconnecting the third drain electrode DE3 and the sustain electrode line SLn.

However, the present disclosure is not limited thereto, and the shield pattern SHP may receive the common voltage Vcom through a separate terminal. In other exemplary embodiments, the shield pattern SHP may be in a floated state.

A spacer CS may be disposed on the shield pattern SHP. The spacer CS may serve to maintain a distance between the array substrate 100d and the opposing substrate 200d. In some embodiments, the spacer CS may include a transparent organic insulation material, such as acrylate or a transparent inorganic insulation material. When the spacer CS is made of an organic insulation material, the spacer CS may include a photosensitive organic insulation material.

In some embodiments, the spacer CS may be disposed on a part of the shield pattern SHP overlapped with at least either the first thin film transistor Tr1 or the second thin film transistor Tr2. Thus, the size of a light blocking member BM, which is described later, may be relatively reduced, and an aperture ratio of the liquid crystal display device 5 may be improved.

The opposing substrate 200d is now described.

The opposing substrate 200d may include a second base substrate SUB2, a light blocking member BM, an overcoat layer OC and a common electrode CE.

Like the first base substrate SUB1, the second base substrate SUB2 may be a transparent insulation substrate. Furthermore, the second base substrate SUB2 may include polymers or plastics excellent in heat resisting property. In some embodiments, the second base substrate SUB2 may have flexibility.

The light blocking member BM may be disposed on one surface of the second base substrate SUB2 facing the first base substrate SUB1. In some embodiments, the light blocking member BM may include a part overlapped with the gate line GLn and the first, the second and the third thin film transistors Tr1, Tr2 and Tr3 and a part overlapped with the data lines DLm and DLm+1. The light blocking member BM may include a light blocking pigment, such as black carbon, or an opaque material, such as chrome (Cr), and include a photosensitive organic material.

The overcoat layer OC may be formed on the second base substrate SUB2 and the light blocking member BM and cover the light blocking member BM. The overcoat layer OC may planarize a stepped portion formed by the light blocking member BM. In some embodiments, the overcoat layer OC may be omitted.

The common electrode CE may be disposed on the overcoat layer OC. In some embodiments in which the overcoat layer OC is omitted, the common electrode CE may be disposed on the second base substrate SUB2 and the light blocking member BM. The common electrode CE may be made of a transparent conductive material, such as ITO and IZO. In some embodiments, the common electrode CE may be formed all over the whole surface of the second base substrate SUB2. A common voltage Vcom may be applied to the common electrode CE to generate an electric field between the common electrode CE and the pixel electrode PE.

The liquid crystal display device 5 according to the exemplary embodiment of the present inventive concept provides improved side visibility and suppresses crosstalk defects caused by the parasitic capacitance of the first thin film transistor Tr1 and the second thin film transistor Tr2 of their own, for example, parasitic capacitance among the first source electrode SE1, the first drain electrode DE1, the second source electrode SE2 and the second drain electrode DE2.

Furthermore, a coupling electric field is blocked between the first thin film transistor Tr1 and/or the second thin film transistor Tr2 and other components, for example, between at least either the first thin film transistor Tr1 or the second thin film transistor Tr2 and data lines DLm and DLm+1, thereby further suppressing occurrence of crosstalk defects.

A sustain voltage Vc or a common voltage Vcom may be applied to the shield pattern SHP. In such case, no electric field would be generated between the common electrode CE and the shield pattern SHP, or even if an electric field is generated therebetween, the intensity of the electric field would be low. Therefore, the probability of misalignment of the liquid crystal molecules disposed in a region adjacent to the first thin film transistor Tr1 and/or the second thin film transistor Tr2 may be lowered. Thus, light leakage caused by the misalignment of liquid crystal molecules in the vicinity of the first thin film transistor Tr1 and/or the second thin film transistor Tr2 may be reduced, and an area of the light blocking member BM may be reduced. Thus, an aperture ratio of the liquid crystal display device 5 may be increased.

Figure 20:
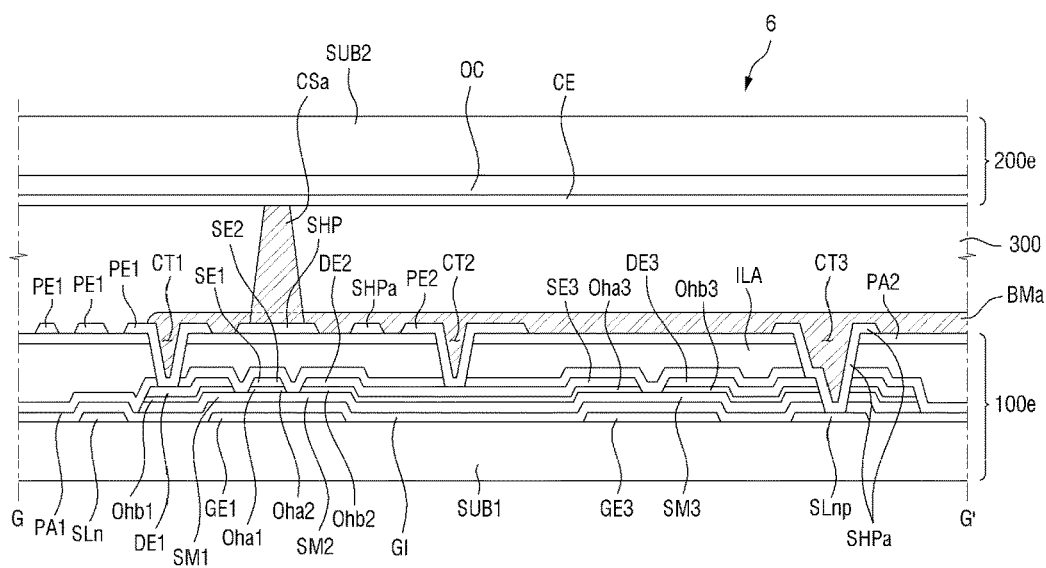
FIG. 20 and FIG. 21 are cross-sectional views illustrating modified embodiments of the liquid crystal display device shown in FIG. 17 to FIG. 19.
Figure 21:
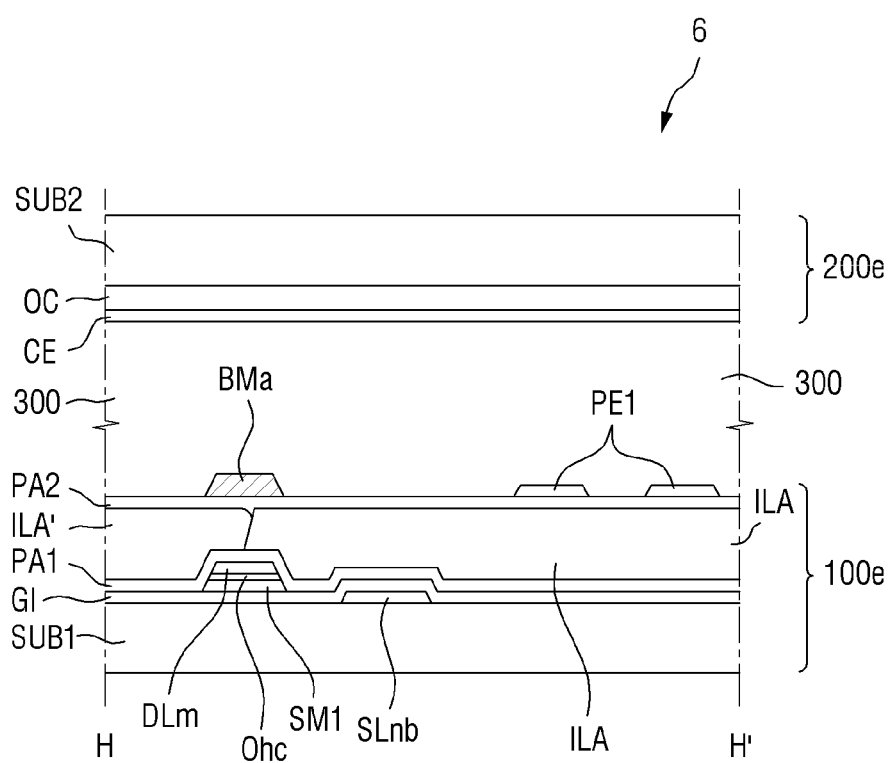

FIG. 20 and FIG. 21 are cross-sectional views illustrating modified embodiments of the liquid crystal display device shown in FIG. 17 to FIG. 19.

Referring to FIG. 20 and FIG. 21, a liquid crystal display device 6 according to the exemplary embodiment of the present inventive concept may include an array substrate 100e, an opposing substrate 200e and a liquid crystal layer 300. The liquid crystal display device 6 may further include a pair of polarizers (not shown) attached to outer surfaces of the array substrate 100e and the opposing substrate 200e.

Unlike the array substrate 100d (shown in FIG. 17 to FIG. 19) described with reference to FIG. 17 to FIG. 19, the array substrate 100e may include a light blocking member BMa.

The light blocking member BMa may be disposed on a part of the first subpixel electrode PE1 and the second subpixel electrode PE2, the second passivation layer PA2 and the shield pattern SHP and may directly contact the part of the first pixel electrode PE1 and the second subpixel electrode PE2, the second passivation layer PA2 and the shield pattern SHP. The light blocking member BMa may include a part overlapped with the gate line GLn and the first, the second and the third thin film transistors Tr1, Tr2 and Tr3, and a part overlapped with the data lines DLm and DLm+1. At least a part of the light blocking member BMa may fill the first contact hole CT1, the second contact hole CT2 and the sustain electrode contact hole CT3. The light blocking member BMa may include a light blocking pigment, for example, black carbon and the like, and include a photosensitive organic material.

The spacer CSa may be disposed on the light blocking member BMa and may directly contact the light blocking member BMa. In some embodiments, the spacer CSa may include a light blocking pigment and may be made of a material same as that of the light blocking member BMa.

In some embodiments, the spacer CSa may be formed integrally with the light blocking member BMa and formed simultaneously with the light blocking member BMa by using a single photomask (for example, a halftone mask).

Other features of the array substrate 100e are substantially the same as those described above with reference to FIG. 17 to FIG. 19, and thus description thereof is omitted.

The opposing substrate 200e may include a second base substrate SUB2, an overcoat layer OC and a common electrode CE but may not include a light blocking member. That is, the opposing substrate 200e differs from the opposing substrate 200d (shown in FIG. 18 and FIG. 19) described with reference to FIG. 17 to FIG. 19 in that the former does not include a light blocking member, but other features of the opposing substrate 200a may be substantially the same as those of the opposing substrate 200d. Therefore, detailed description thereof is omitted.

In the liquid crystal display device 6 of the exemplary embodiment of the present inventive concept, the light blocking member BMa may be disposed on the array substrate 100e together with the first, the second and the third thin film transistors Tr1, Tr2 and Tr3, thereby preventing light leakage or a decrease in the aperture ratio caused by a misalignment among the light blocking member BMa, the first subpixel electrode PE1, the second subpixel electrode PE2 and the first, the second and the third thin film transistors Tr1, Tr2 and Tr3 and improving transmittance.

Figure 22:
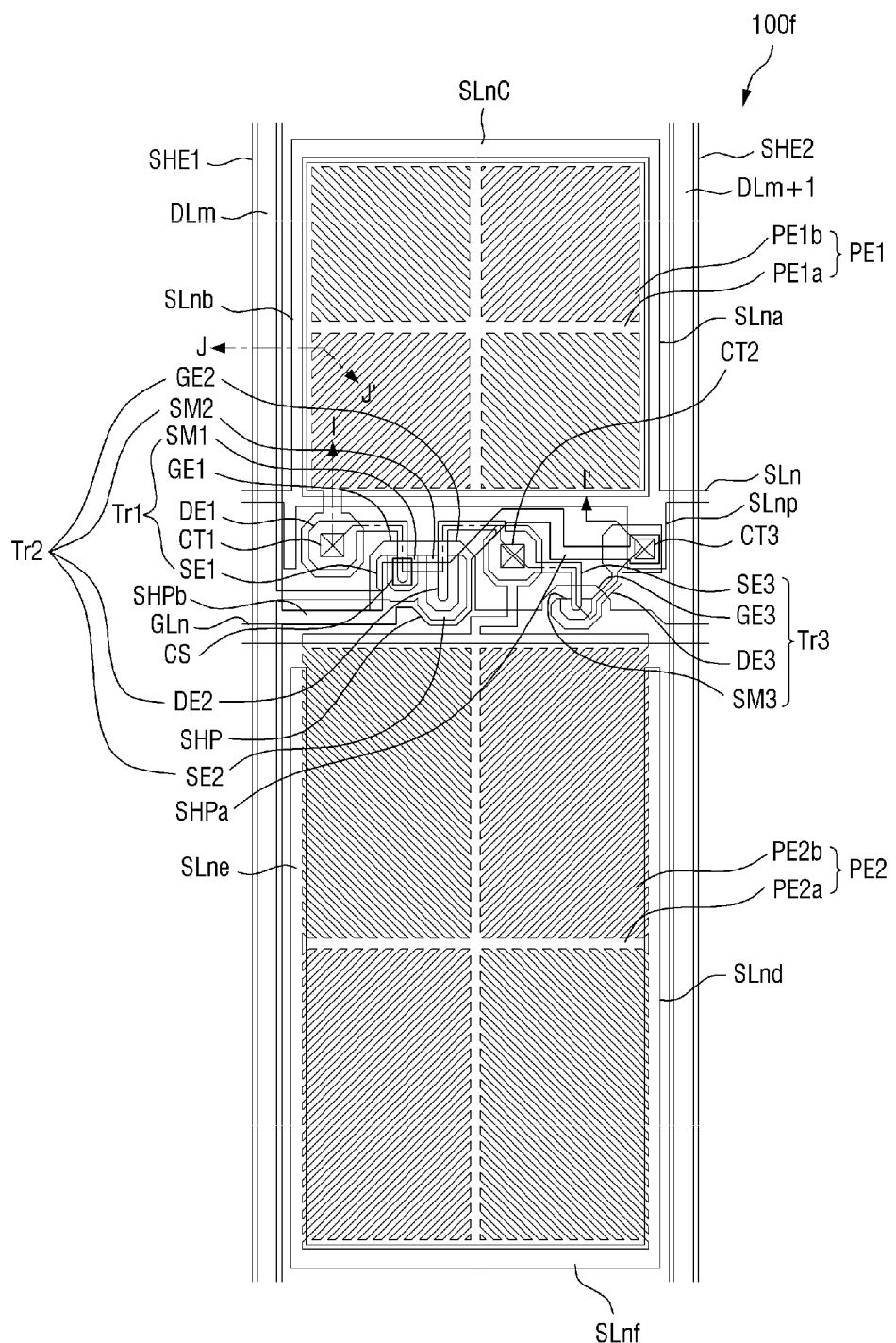
FIG. 22 is a schematic plan view illustrating an array substrate of a liquid crystal display device according to yet still another exemplary embodiment of the present inventive concept, and more specifically, a plan view schematically illustrating the structure of one pixel.
Figure 23:
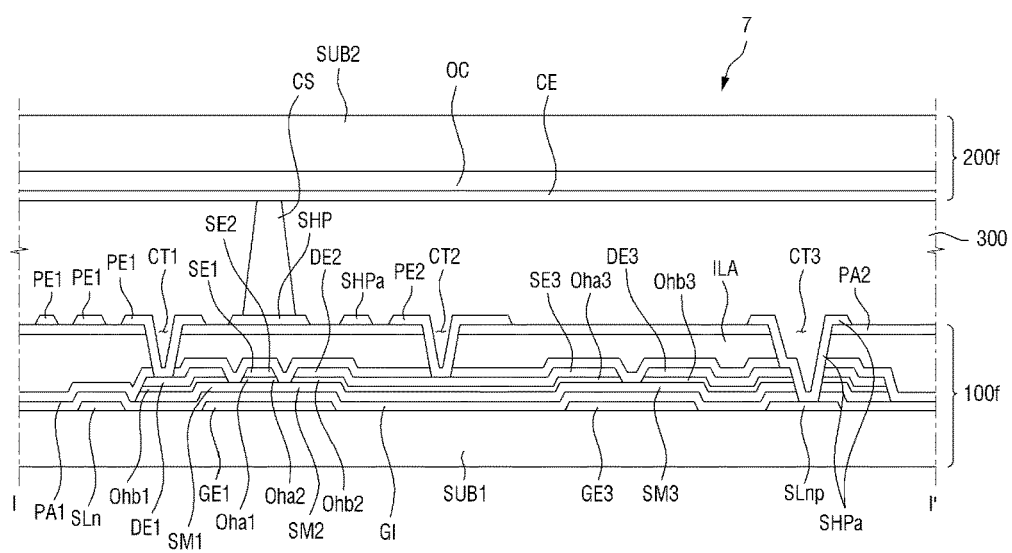
FIG. 23 is a schematic cross-sectional view taken along line I-I' of FIG. 22 and illustrates the liquid crystal display device including the array substrate of FIG. 22.
Figure 24:
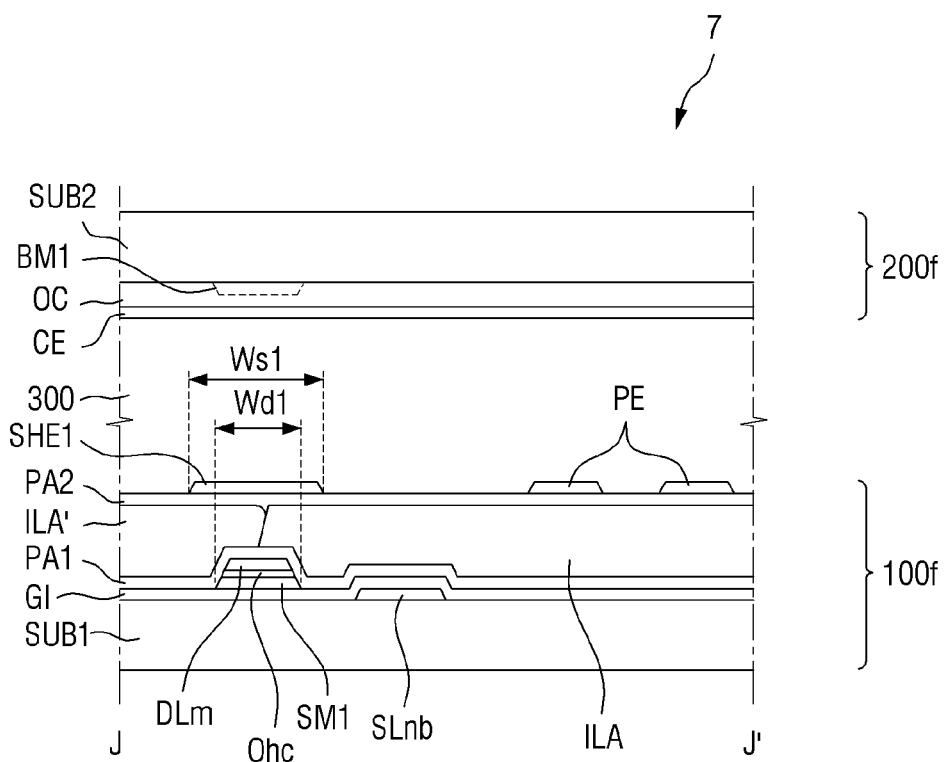
FIG. 24 is a schematic cross-sectional view taken along line J-J' of FIG. 22 and illustrates the liquid crystal display device including the array substrate of FIG. 22.

FIG. 22 is a schematic plan view illustrating an array substrate of a liquid crystal display device according to yet still another exemplary embodiment of the present inventive concept, and more specifically, a plan view schematically illustrating the structure of one pixel. FIG. 23 is a schematic cross-sectional view taken along line I-I' of FIG. 22 and illustrates the liquid crystal display device including the array substrate of FIG. 22. FIG. 24 is a schematic cross-sectional view taken along line J-J' of FIG. 22 and illustrates the liquid crystal display device including the array substrate of FIG. 22.

Referring to FIG. 22 to FIG. 24, a liquid crystal display device 7 according to the exemplary embodiment of the present inventive concept may include an array substrate 100f, an opposing substrate 200f facing the array substrate 100f, and a liquid crystal layer 300 interposed between the array substrate 100f and the opposing substrate 200f. The liquid crystal display device 7 may further include a pair of polarizers (not shown) attached to outer surfaces of the array substrate 100f and the opposing substrate 200f.

Unlike the array substrate 100e (shown in FIG. 17 to FIG. 19) described above with reference to FIG. 17 to FIG. 19, the array substrate 100f may include shield electrodes SHE1 and SHE2.

The shield electrodes SHE1 and SHE2 may be disposed on the second passivation layer PA2. Like the shield pattern SHP, the shield electrodes SHE1 and SHE2 may be physically spaced apart from the first subpixel electrode PE1 and the second subpixel electrode PE2 and disposed on the same layer as the first subpixel electrode PE1 and the second subpixel electrode PE2. That is, like the first subpixel electrode PE1 and the second subpixel electrode PE2, the shield electrodes SHE1 and SHE2 may be disposed directly on the second passivation layer PA2 and directly contact the second passivation layer PA2. The shield electrodes SHE1 and SHE2 may be made of a transparent conductive material and made of a material same as that of the shield pattern SHP and the pixel electrode PE. In some embodiments, the shield electrodes SHE1 and SHE2, the shield pattern SHP and the pixel electrode PE may be simultaneously formed by using a single mask.

The shield electrodes SHE1 and SHE2 may be disposed on a part of the second passivation layer PA2 corresponding to the data lines DLm and DLm+1 and may be overlapped with the data lines DLm and DLm+1. The first shield electrode SHE1 overlapped with the first data line DLm has a width Ws1 in a horizontal direction, that is, the direction in which the gate line GLn extends, wider than a horizontal width Wd1 of the first data line DLm. Likewise, the second shield electrode SHE2 overlapped with the second data line DLm+1 has a width Ws2 in a horizontal direction, that is, the direction in which the gate line GLn extends, wider than a horizontal width Wd2 of the second data line DLm+1. Furthermore, when viewed in a plane, the first shield electrode SHE1 may cover the first data line DLm, and the second shield electrode SHE2 may likewise cover the second data line DLm+1.

In some embodiments, a common voltage Vcom or a sustain voltage Vc may be applied to the shield electrodes SHE1 and SHE2.

In some embodiments, at least either the first shield electrode SHE1 or the second shield electrode SHE2 may be electrically connected to the shield pattern SHP. In an exemplary embodiment, the first shield pattern extension SHPa of the shield pattern SHP may contact the sustain electrode extension SLnp through the sustain electrode contact hole CT3, and further extend toward the second shield electrode SHE2 to be connected to the second shield electrode SHE2. Thus, the shield pattern SHP and the second shield electrode SHE2 may be electrically connected to the sustain electrode line SLn so as to receive the sustain voltage Vc.

In some embodiments, the shield pattern SHP may further include a second shield pattern extension SHPb as shown in FIG. 22. The second shield pattern extension SHPb may be extended toward the first shield electrode SHE1 and electrically connected to the first shield electrode SHE1. Thus, the first shield electrode SHE1, the shield pattern SHP and the second shield electrode SHE2 may be electrically interconnected. Accordingly, when the sustain voltage Vc is applied to the shield pattern SHP, the first shield electrode SHE1 and the second shield electrode SHE2 are also supplied with the sustain voltage Vc.

The sustain voltage Vc may be substantially the same as the common voltage Vcom, or the sustain voltage Vc may have a small voltage level difference from the common voltage Vcom.

However, the connection relation among the first shield electrode SHE1, the shield pattern SHP and the second shield electrode SHE2 is not limited to those described above. In other exemplary embodiments, the first shield electrode SHE1 and the second shield electrode SHE2 may be electrically connected, and the shield pattern SHP may not be electrically connected to the first shield electrode SHE1 and the second shield electrode SHE2. Alternatively, only either the first shield electrode SHE1 or second shield electrode SHE2 may be electrically connected to the shield pattern SHP. Alternatively, all of the first shield electrode SHE1, the second shield electrode SHE2 and the shield pattern SHP may not be electrically connected to each other.

Furthermore, the path for providing voltages to the first shield electrode SHE1, the shield pattern SHP and the second shield electrode SHE2 is not limited to those described above. For example, in other exemplary embodiments, the common voltage Vcom may be provided to at least any one of the first shield electrode SHE1, the shield pattern SHP and the second shield electrode SHE2 through a separate terminal.

In some embodiments, at least any one of the first shield electrode SHE1, the second shield electrode SHE2 and the shield pattern SHP may be in a floated state.

Other features of the array substrate 100$f$ are substantially the same as those described above with reference to FIG. 17 to FIG. 19, and thus description thereof is omitted.

The opposing substrate 200$f$ may include a second base substrate SUB2, a light blocking member BM, an overcoat layer OC and a common electrode CE.

In some embodiments, the light blocking member BM may include a part overlapped with the gate line GLn and the first, the second and the third thin film transistors Tr1, Tr2 and Tr3. Furthermore, a part BM1 of the light blocking member BM overlapped with the data lines DLm and DLm+1 may be omitted, or an area of the part BM1 may be decreased. The other components are substantially the same as those described above with reference to FIG. 17 to FIG. 19, and thus description thereof is omitted.

An electric field generated between the first subpixel electrode PE1 and the common electrode CE and between the second subpixel electrode PE2 and the common electrode CE may be relatively weak in a region between the data lines DLm, DLm+1 and the pixel electrode PE, and thus the likelihood of misalignment of liquid crystal molecules may be high in the region.

In the liquid crystal display device 7 according to the exemplary embodiment of the present inventive concept, the sustain voltage Vc may be applied to the shield electrodes SHE1 and SHE2 as well as to the shield pattern SHP, or a voltage having a level same as that of the voltage applied to the common electrode CE, for example, the common voltage Vcom, may be applied to the shield electrodes SHE1 and SHE2 and the shield pattern SHP. In such case, no electric field would be generated between the common electrode CE and the shield electrodes SHE1 and SHE2, or even if an electric field is generated therebetween, the intensity of the electric field would be low. Therefore, the probability of misalignment of the liquid crystal molecules disposed in a region adjacent to the data lines DLm and DLm+1 may be lowered. Thus, light leakage caused by the misalignment of liquid crystal molecules in the vicinity of the data lines DLm and DLm+1 may be reduced, an area of the light blocking member BM may further be reduced, and an aperture ratio of the liquid crystal display device 7 may further be increased.

Furthermore, an electric field generated between the data lines DLm and DLm+1 and the pixel electrode PE may be weakened by the shield electrodes SHE1 and SHE2, thus providing advantages of suppressed crosstalk defects.

Figure 25:
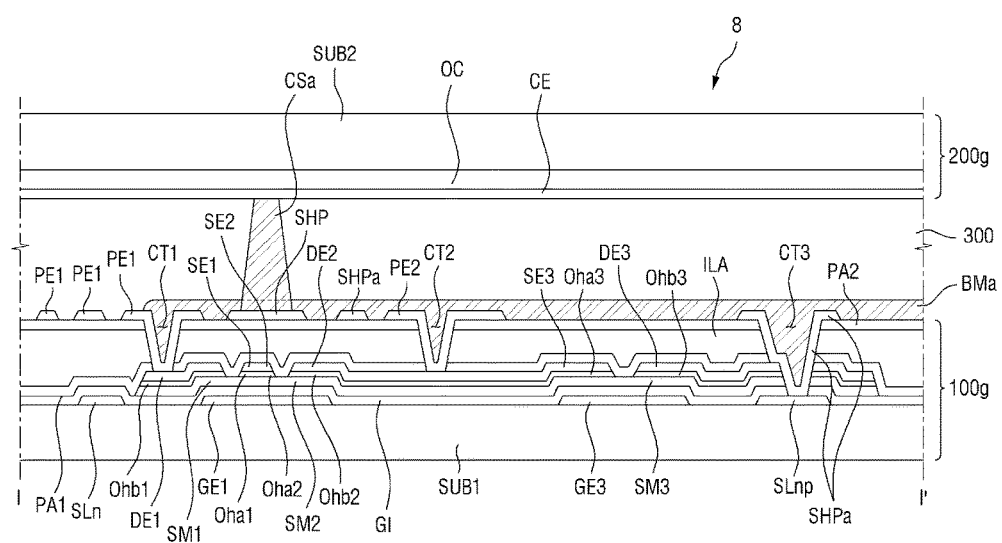
FIG. 25 and FIG. 26 are cross-sectional views illustrating modified embodiments of the liquid crystal display device shown in FIG. 22 to FIG. 24.
Figure 26:
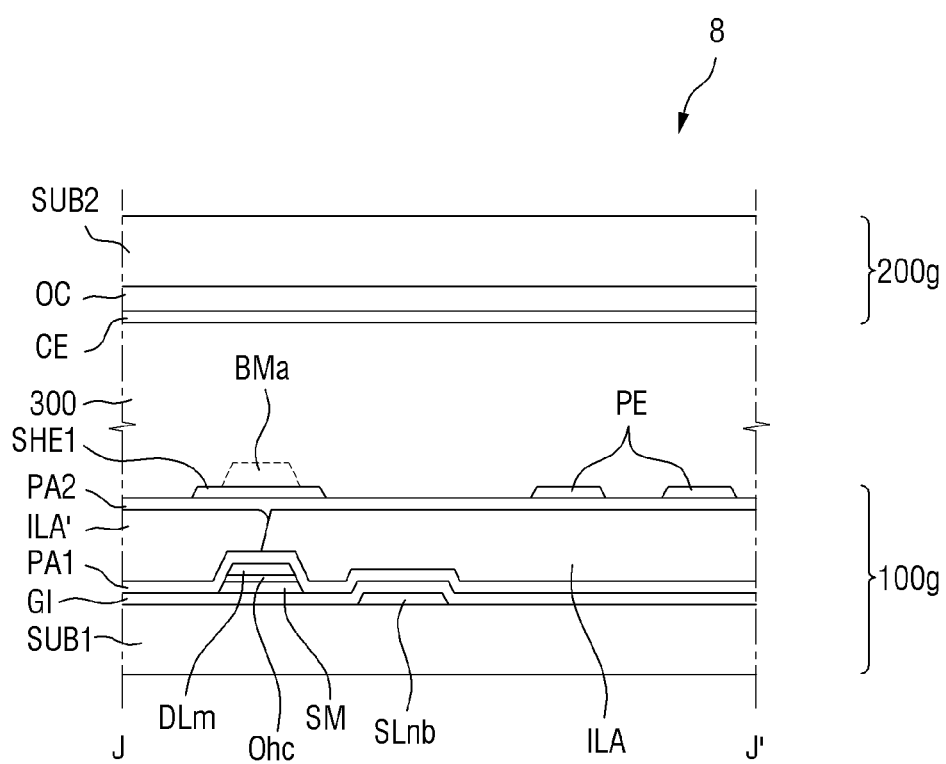

FIG. 25 and FIG. 26 are cross-sectional views illustrating modified embodiments of the liquid crystal display device shown in FIG. 22 to FIG. 24.

Referring to FIG. 25 and FIG. 26, a liquid crystal display device 8 according to the exemplary embodiment of the present inventive concept may include an array substrate 100$g$, an opposing substrate 200$g$ and a liquid crystal layer 300. The liquid crystal display device 8 may further include a pair of polarizers (not shown) attached to outer surfaces of the array substrate 100$g$ and the opposing substrate 200$g$.

Unlike the array substrate 100$f$ (shown in FIG. 23 and FIG. 24) described with reference to FIG. 23 and FIG. 24, the array substrate 100$g$ may include a light blocking member BMa.

The light blocking member BMa may be disposed on a part of the first subpixel electrode PE1 and the second subpixel electrode PE2, the second passivation layer PA2 and the shield pattern SHP and may directly contact the part of the first subpixel electrode PE1 and the second subpixel electrode PE2, the second passivation layer PA2 and the shield pattern SHP. The light blocking member BMa may include a part overlapped with the gate line GLn and the first, the second and the third thin film transistors Tr1, Tr2 and Tr3. A part BMa1 of the light blocking member BMa overlapped with the data lines DLm and DLm+1 may be omitted, or an area of the part BMa1 may be reduced.

The spacer CSa may be disposed on the light blocking member BMa and may directly contact the light blocking member BMa. In some embodiments, the spacer CSa may include a light blocking pigment and may be made of a material same as that of the light blocking member BMa.

In some embodiments, the spacer CSa may be formed integrally with the light blocking member BMa and formed simultaneously with the light blocking member BMa by using a single photomask.

Other features of the array substrate 100$g$ are substantially the same as those described above with reference to FIG. 23 and FIG. 24, and thus description thereof is omitted.

The opposing substrate 200$g$ may include a second base substrate SUB2, an overcoat layer OC and a common electrode CE but may not include a light blocking member. That is, the opposing substrate 200$g$ differs from the opposing substrate 200$f$ (shown in FIG. 23 and FIG. 24) described with reference to FIG. 23 and FIG. 24 in that the former does not include a light blocking member, but other features of the opposing substrate 200$g$ may be substantially the same as those of the opposing substrate 200$f$. Therefore, detailed description thereof is omitted.

Figure 27:
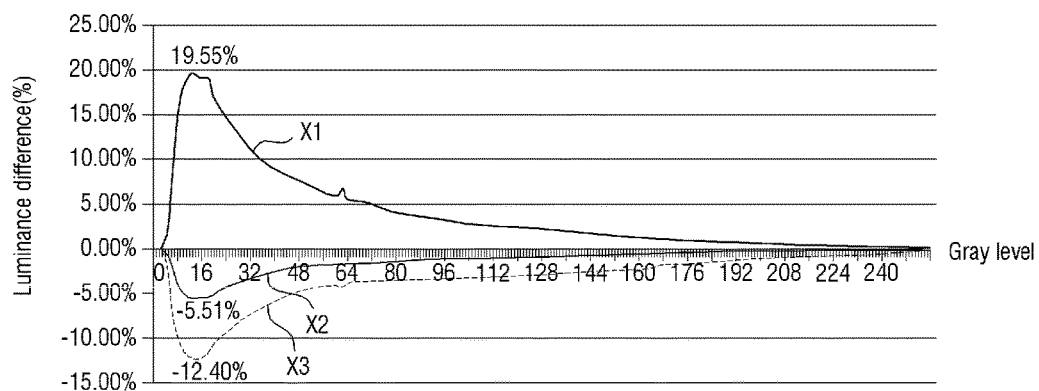
FIG. 27 and FIG. 28 are graphical representations illustrating vertical crosstalk (V-CT) values of a liquid crystal display device measured when a shield pattern exists and no shield pattern exist, respectively.
Figure 28:
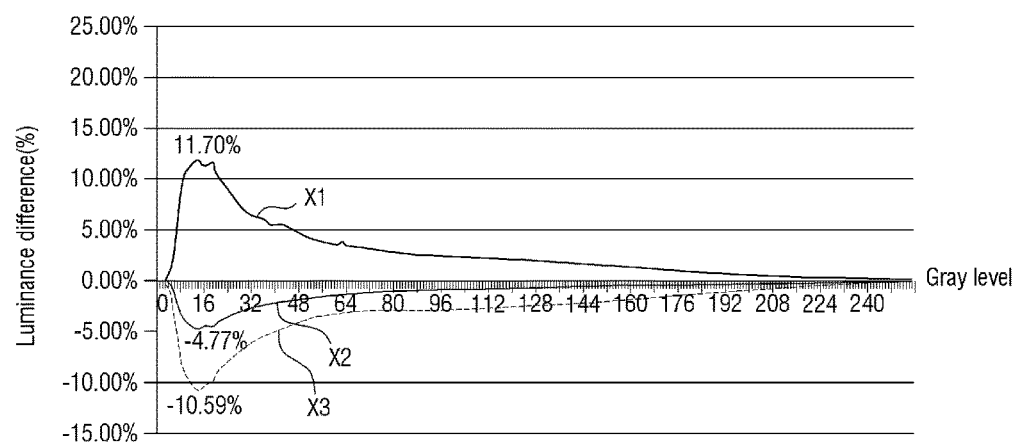

FIG. 27 and FIG. 28 are graphical representations illustrating vertical crosstalk (V-CT) values of a liquid crystal display device measured when no shield pattern exists and a shield pattern exists, respectively. More specifically, FIG. 27 is a graphical representation illustrating V-CT values of a liquid crystal display device measured when no shield pattern exist, and FIG. 28 is a graphical representation illustrating V-CT values of a liquid crystal display device measured when a shield pattern exists. The components of the liquid crystal display device may be substantially the same as those of the liquid crystal display device shown in FIG. 22 except for the presence or absence of the shield pattern.

Referring to FIG. 27 and FIG. 28, on the assumptions that a distance between a pixel electrode and a left data line is the same as a distance between the pixel electrode and a right data line, and a first data line is provided at a left side of the pixel electrode and a second data line is provided at a right side of the pixel electrode, X2 denotes that a distance between the pixel electrode and the first data line is the same as a distance between the pixel electrode and the second data line (for example, a regularly aligned state). In addition, X1 denotes that the pixel electrode has moved 3 µm toward the first data line from the regularly aligned state, and X3 denotes that the pixel electrode has moved 3 µm toward the second data line from the regularly aligned state.

Referring to FIG. 27 and FIG. 28, when the liquid crystal display device has a shield pattern disposed on a thin film transistor according to an exemplary embodiment of the present inventive concept, the V-CT value is checked as being decreased as compared with the liquid crystal display device having no shield pattern, that is to say roughly, the V-CT value is checked as being decreased by 40% maximum in the liquid crystal display device having a shield pattern on the thin film transistor.

While the present inventive concept has been particularly shown and described with reference to exemplary embodiments thereof, these are merely examples and the present disclosure is not limited thereto. It will be understood by those of ordinary skill in the art that various changes in form and details may be made therein without departing from the spirit and scope of the present inventive concept. For example, each component described in the exemplary embodiments of the present disclosure may be modified. Furthermore, differences related to the modifications and applications are included in the scope of the present inventive concept defined in the appended claims.

What is claimed is:

1. A liquid crystal display device comprising:
a first base substrate;
a gate line disposed on the first base substrate and extended in a first direction;
a data line disposed on the first base substrate, extended in a second direction intersecting the first direction, and insulated from the gate line;
a thin film transistor disposed on the first base substrate and electrically connected to the gate line and the data line;
a pixel electrode electrically connected to the thin film transistor;
a shield pattern disposed on a same layer as the pixel electrode, spaced apart from the pixel electrode, overlapped with a channel of the thin film transistor in a plan view, and including a material same as a material of the pixel electrode; and
a spacer disposed on the shield pattern,
wherein the spacer overlaps the thin film transistor.

2. The liquid crystal display device of claim 1, wherein a first voltage is applied to the pixel electrode and a second voltage having a level different from a level of the first voltage is applied to the shield pattern.

3. The liquid crystal display device of claim 1, further comprising an insulation layer disposed on the first base substrate and covering the thin film transistor,
wherein the pixel electrode and the shield electrode are disposed on the insulation layer, and the pixel electrode is electrically connected to the thin film transistor through a contact hole formed in the insulation layer.

4. The liquid crystal display device of claim 3, wherein the insulation layer includes a color pigment.

5. The liquid crystal display device of claim 1, wherein the spacer directly contacts the shield pattern.

6. The liquid crystal display device of claim 1, further comprising a light blocking member disposed on the shield pattern and overlapped with the thin film transistor,
wherein the spacer is disposed on the light blocking member and includes a material same as a material of the light blocking member.

7. A liquid crystal display device comprising:
a first base substrate;
a gate line disposed on the first base substrate and extended in a first direction;
a data line disposed on the first base substrate, extended in a second direction intersecting the first direction, and insulated from the gate line;
a thin film transistor disposed on the first base substrate and electrically connected to the gate line and the data line;
a pixel electrode electrically connected to the thin film transistor;
a shield pattern disposed on a same layer as the pixel electrode, spaced apart from the pixel electrode, overlapped with a channel of the thin film transistor in a plan view, and including a material same as a material of the pixel electrode;
a sustain electrode line provided on the first base substrate and disposed along an edge of the pixel electrode,
wherein the shield pattern is electrically connected to the sustain electrode line,
wherein the thin film transistor includes a gate electrode electrically connected to the gate line, and
wherein the gate electrode of the thin film transistor and the sustain electrode line are disposed directly on a same layer.

8. The liquid crystal display device of claim 1, further comprising a liquid crystal layer disposed on the pixel electrode; a second base substrate disposed on the liquid crystal layer; and a common electrode interposed between the second base substrate and the liquid crystal layer.

9. The liquid crystal display device of claim 8, wherein a voltage having a same level is applied to the common electrode and the shield pattern.

10. The liquid crystal display device of claim 8, further comprising a light blocking member interposed between the second base substrate and the common electrode, and overlapped with the thin film transistor and the shield pattern.

11. A liquid crystal display device comprising:
a first base substrate;
a gate line disposed on the first base substrate and extended in a first direction;
a data line disposed on the first base substrate, insulated from the gate line and extended in a second direction intersecting the first direction;
a thin film transistor disposed on the first base substrate and electrically connected to the gate line and the data line;
an insulation layer disposed on the thin film transistor and the data line;
a shield electrode disposed on the data line along the second direction and overlapped with the data line;
a shield pattern disposed on the thin film transistor, overlapped with a channel of the thin film transistor in a plan view, and including a material same as a material of the shield electrode; and
a spacer disposed on the shield pattern,
wherein the spacer overlaps the thin film transistor.

12. The liquid crystal display device of claim 11, wherein the shield pattern and the shield electrode are disposed on a same layer and directly contact the same layer.

13. The liquid crystal display device of claim 11, wherein the shield pattern and the shield electrode include a transparent conductive material.

14. The liquid crystal display device of claim 11, further comprising a pixel electrode disposed on the insulation layer, spaced apart from the shield pattern and the shield electrode, and electrically connected to the thin film transistor through a contact hole formed in the insulation layer,
wherein the shield pattern and the shield electrode are disposed on the insulation layer.

15. The liquid crystal display device of claim 14, wherein the insulation layer includes a color pigment.

16. The liquid crystal display device of claim 14, wherein the pixel electrode, the shield electrode and the shield pattern include a same material.

17. The liquid crystal display device of claim 14, wherein a first voltage is applied to the pixel electrode, and a second voltage having a level different from a level of the first voltage is applied to at least either the shield pattern or the shield electrode.

18. The liquid crystal display device of claim 11, wherein a width of the shield electrode is wider than a width of the data line when seen in a plan view.

19. The liquid crystal display device of claim 11, wherein the shield electrode covers the data line along the first direction when seen in a plan view.

20. The liquid crystal display device of claim 11, wherein the spacer directly contacts the shield pattern.

21. The liquid crystal display device of claim 11, further comprising a light blocking member disposed on the shield pattern and overlapped with the thin film transistor,
wherein the spacer is disposed on the light blocking member and includes a material same as a material of the light blocking member.

22. The liquid crystal display device of claim 11, wherein the shield pattern is electrically connected to the shield electrode.

23. A liquid crystal display device comprising:
a first base substrate;
a gate line disposed on the first base substrate and extended in a first direction;
a data line disposed on the first base substrate, insulated from the gate line and extended in a second direction intersecting the first direction;
a thin film transistor disposed on the first base substrate and electrically connected to the gate line and the data line;
an insulation layer disposed on the thin film transistor and the data line;
a shield electrode disposed on the data line along the second direction and overlapped with the data line;
a shield pattern disposed on the thin film transistor, overlapped with a channel of the thin film transistor in a plan view, and including a material same as a material of the shield electrode; and
a sustain electrode line provided on the first base substrate and disposed along an edge of the pixel electrode,
wherein at least one of the shield electrode and the shield pattern is electrically connected to the sustain electrode line,
wherein the thin film transistor includes a gate electrode electrically connected to the gate line, and
wherein the gate electrode of the thin film transistor and the sustain electrode line are disposed directly on a same layer.

24. The liquid crystal display device of claim 11, further comprising a liquid crystal layer disposed on the shield electrode and the shield pattern; a second base substrate disposed on the liquid crystal layer; and a common electrode interposed between the liquid crystal layer and the second base substrate.

25. The liquid crystal display device of claim of claim 24, wherein a voltage having a same level is applied to the common electrode, the shield pattern and the shield electrode.

26. The liquid crystal display device of claim 25, further comprising a light blocking member interposed between the second base substrate and the common electrode and overlapped with the thin film transistor and the shield pattern.

* * * * *